United States Patent
Kamiya et al.

(10) Patent No.: US 9,381,647 B2
(45) Date of Patent: Jul. 5, 2016

(54) FORCE DETECTION DEVICE, ROBOT, AND MOVING OBJECT

(71) Applicant: Seiko Epson Corporation, Tokyo (JP)

(72) Inventors: Toshiyuki Kamiya, Fujimi-machi (JP); Takanobu Matsumoto, Minowa-machi (JP); Hideaki Oka, Minowa-machi (JP); Hiroki Kawai, Matsumoto (JP)

(73) Assignee: Seiko Epson Corporation (JP)

( * ) Notice: Subject to any disclaimer, the term of this patent is extended or adjusted under 35 U.S.C. 154(b) by 25 days.

(21) Appl. No.: 14/181,915

(22) Filed: Feb. 17, 2014

(65) Prior Publication Data
US 2014/0236354 A1 Aug. 21, 2014

(30) Foreign Application Priority Data

Feb. 19, 2013 (JP) .................. 2013-029728
Feb. 27, 2013 (JP) .................. 2013-036773

(51) Int. Cl.
| | |
|---|---|
| G05B 15/00 | (2006.01) |
| B25J 13/08 | (2006.01) |
| G01L 1/14 | (2006.01) |
| G01L 1/16 | (2006.01) |
| G01L 5/00 | (2006.01) |

(52) U.S. Cl.
CPC .............. B25J 13/085 (2013.01); G01L 1/142 (2013.01); G01L 1/144 (2013.01); G01L 1/146 (2013.01); G01L 1/16 (2013.01); G01L 5/0076 (2013.01)

(58) Field of Classification Search
CPC ........... G01L 1/16; G01L 1/142; G01L 1/144; G01L 1/146; G01L 5/0076; B25J 13/085; B25J 19/028

USPC ........ 700/258, 260; 73/581, 862.381, 862.42, 73/862.471, 862.392, 514.34, 35.11, 35.13
See application file for complete search history.

(56) References Cited

U.S. PATENT DOCUMENTS

| | | | | | |
|---|---|---|---|---|---|
| 3,548,314 | A | * | 12/1970 | Mitchell | A61F 2/68 310/319 |
| 3,569,747 | A | * | 3/1971 | Siegel | B06B 1/0651 310/319 |
| 4,802,371 | A | * | 2/1989 | Calderara | G01L 1/16 310/338 |
| 5,252,928 | A | * | 10/1993 | Giorgetta | G06G 7/1865 330/51 |
| 5,523,642 | A | * | 6/1996 | Hashimoto | G01L 1/16 310/319 |

(Continued)

FOREIGN PATENT DOCUMENTS

| | | |
|---|---|---|
| EP | 1814167 A2 | 8/2007 |
| JP | 63-134929 | 6/1988 |

(Continued)

Primary Examiner — Khoi Tran
Assistant Examiner — Jorge Peche
(74) Attorney, Agent, or Firm — Harness, Dickey & Pierce, P.L.C.

(57) ABSTRACT

A force detection device includes a charge output element that outputs charge in accordance with a received external force, a conversion and output circuit, having a first switching element and a first capacitor, which converts the charge into a voltage and outputs the voltage, a compensation signal output circuit, having a second switching element and a second capacitor, which outputs a compensation signal, and an external force detection circuit that detects an external force on the basis of the voltage which is output from the conversion and output circuit and the compensation signal which is output from the compensation signal output circuit. The capacitance of the second capacitor is smaller than the capacitance of the first capacitor.

9 Claims, 13 Drawing Sheets

(56) References Cited

U.S. PATENT DOCUMENTS

| | | | | |
|---|---|---|---|---|
| 5,677,487 A * | 10/1997 | Hansen | G01P 15/0915 | 310/329 |
| 5,691,595 A * | 11/1997 | Tomikawa | G01C 19/5607 | 310/370 |
| 5,693,998 A * | 12/1997 | Fujimoto | G01C 19/5642 | 310/316.01 |
| 5,708,320 A * | 1/1998 | Ohnishi | G01C 19/5607 | 310/312 |
| 5,850,040 A * | 12/1998 | Okada | G01C 19/56 | 73/504.04 |
| 7,733,219 B2 * | 6/2010 | Kamei | B60R 19/483 | 180/274 |
| 2002/0117153 A1 * | 8/2002 | Zumstrull | H01L 41/257 | 123/498 |
| 2003/0001462 A1 * | 1/2003 | Lee | H01L 41/1132 | 310/365 |
| 2003/0140713 A1 * | 7/2003 | Ohsato | G01L 5/162 | 73/862.041 |
| 2004/0026720 A1 * | 2/2004 | Schiller | G01C 19/56 | 257/226 |
| 2004/0070142 A1 * | 4/2004 | Kawasaki | B65H 7/12 | 271/262 |
| 2004/0094458 A1 * | 5/2004 | Akaike | G01N 33/34 | 209/599 |
| 2005/0248236 A1 * | 11/2005 | Lee | H01L 41/1132 | 310/328 |
| 2007/0022818 A1 * | 2/2007 | Sugiura | G01L 1/16 | 73/756 |
| 2007/0051182 A1 * | 3/2007 | Egawa | G01P 15/0922 | 73/777 |
| 2007/0056176 A1 * | 3/2007 | Matsumiya | G01B 7/012 | 33/551 |
| 2007/0245806 A1 * | 10/2007 | Hirose | F23Q 7/001 | 73/35.13 |
| 2008/0028855 A1 * | 2/2008 | Kano | G01C 19/5698 | 73/504.12 |
| 2008/0289417 A1 * | 11/2008 | Okada | G01C 19/56 | 73/504.03 |
| 2009/0309616 A1 * | 12/2009 | Klinghult | G06F 3/044 | 324/686 |
| 2009/0320594 A1 * | 12/2009 | Ohuchi | H01L 41/08 | 73/504.16 |
| 2009/0320610 A1 | 12/2009 | Ohsato et al. | | |
| 2010/0064804 A1 * | 3/2010 | Kawakubo | G01C 19/56 | 73/504.03 |
| 2010/0077858 A1 * | 4/2010 | Kawakubo | G01P 15/0802 | 73/504.12 |
| 2010/0191153 A1 * | 7/2010 | Sanders | A61B 5/1038 | 600/587 |
| 2010/0223996 A1 * | 9/2010 | Fukumoto | G01C 19/56 | 73/504.12 |
| 2011/0120423 A1 * | 5/2011 | Borchsenius | F02D 41/008 | 123/494 |
| 2011/0121591 A1 * | 5/2011 | Nishiwaki | B66C 1/445 | 294/86.4 |
| 2011/0187674 A1 * | 8/2011 | Baker | G01L 1/10 | 345/174 |
| 2011/0193510 A1 * | 8/2011 | Fleming | B82Y 35/00 | 318/611 |
| 2011/0202300 A1 * | 8/2011 | Udagawa | G01B 21/045 | 702/95 |
| 2012/0126664 A1 | 5/2012 | Ogura et al. | | |
| 2012/0233834 A1 * | 9/2012 | Szechinski | B23P 19/04 | 29/407.01 |
| 2012/0260745 A1 * | 10/2012 | Tsuchiya | B25J 13/085 | 73/862.59 |
| 2012/0304778 A1 * | 12/2012 | Nakamura | G01L 5/228 | 73/778 |
| 2013/0152701 A1 * | 6/2013 | Oka | B25J 9/1633 | 73/862.044 |
| 2013/0188341 A1 * | 7/2013 | Tseng | H02K 35/04 | 362/183 |
| 2014/0378191 A1 * | 12/2014 | Hosoi | H04M 1/03 | 455/575.1 |

FOREIGN PATENT DOCUMENTS

| | | |
|---|---|---|
| JP | 05-095237 B2 | 4/1993 |
| JP | 06-241921 | 9/1994 |
| JP | 09-072757 | 3/1997 |
| JP | 11-108668 | 4/1999 |
| JP | 11-148878 | 6/1999 |
| JP | 2003-207405 A | 7/2003 |
| JP | 2007-205173 A | 8/2007 |
| JP | 2008-051625 A | 3/2008 |
| JP | 2008-145264 A | 6/2008 |
| JP | 2009-058290 A | 3/2009 |
| JP | 2012112748 A | 6/2012 |

* cited by examiner

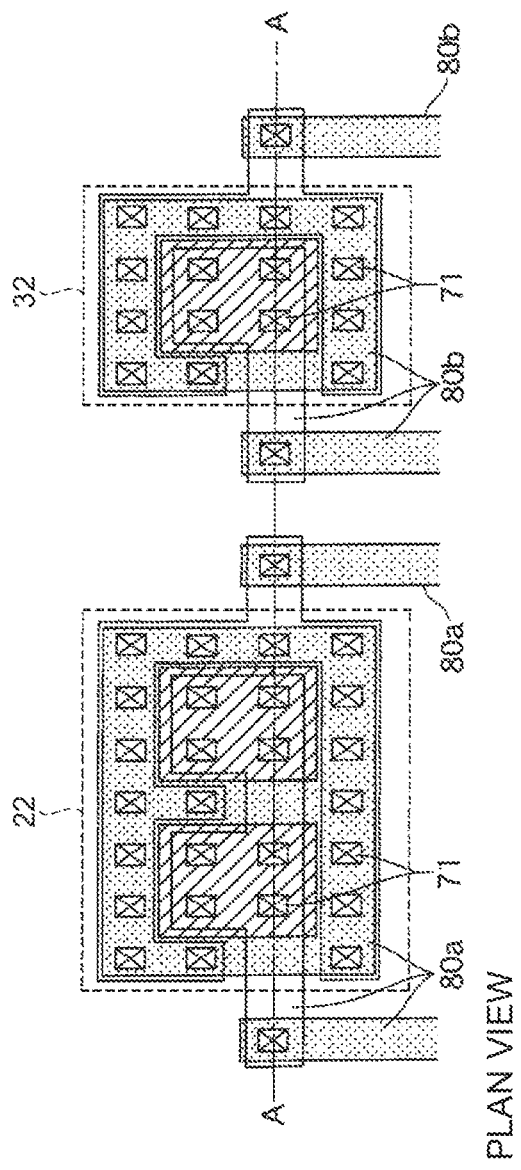
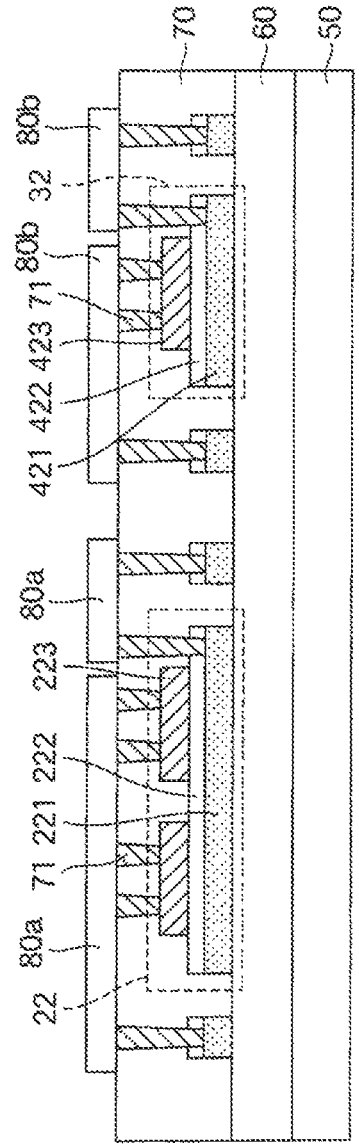
FIG. 3A  PLAN VIEW
FIG. 3B  CROSS-SECTIONAL VIEW TAKEN ALONG LINE A-A

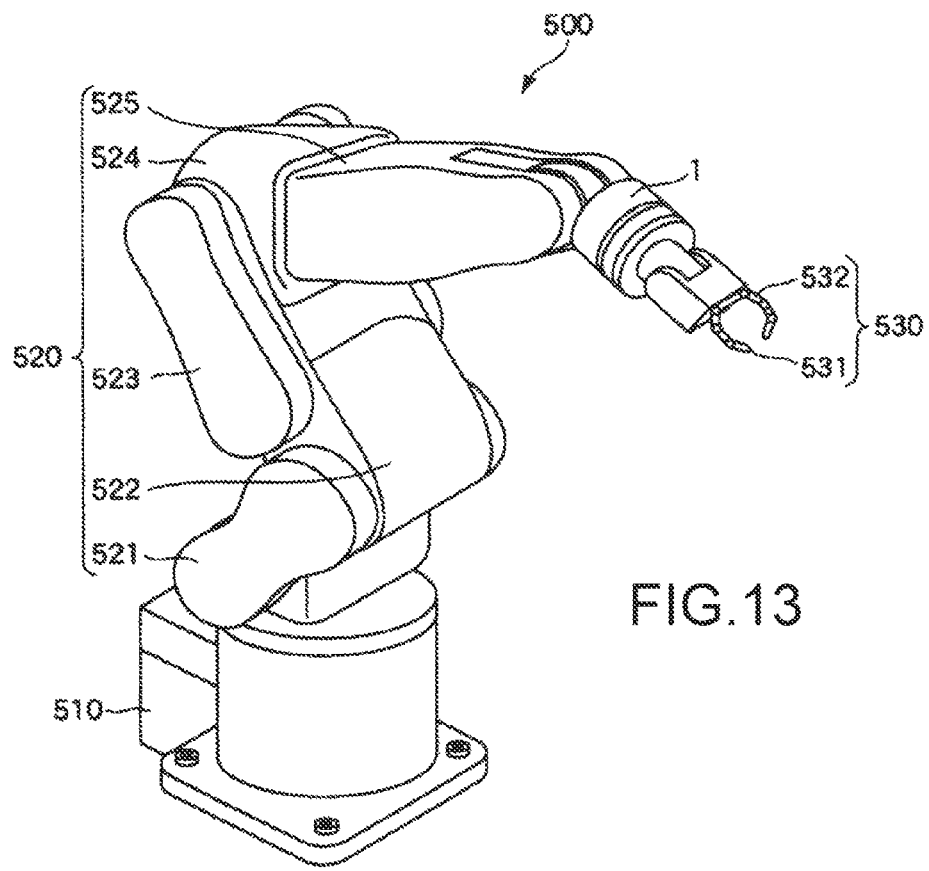
FIG.13
FIG.14
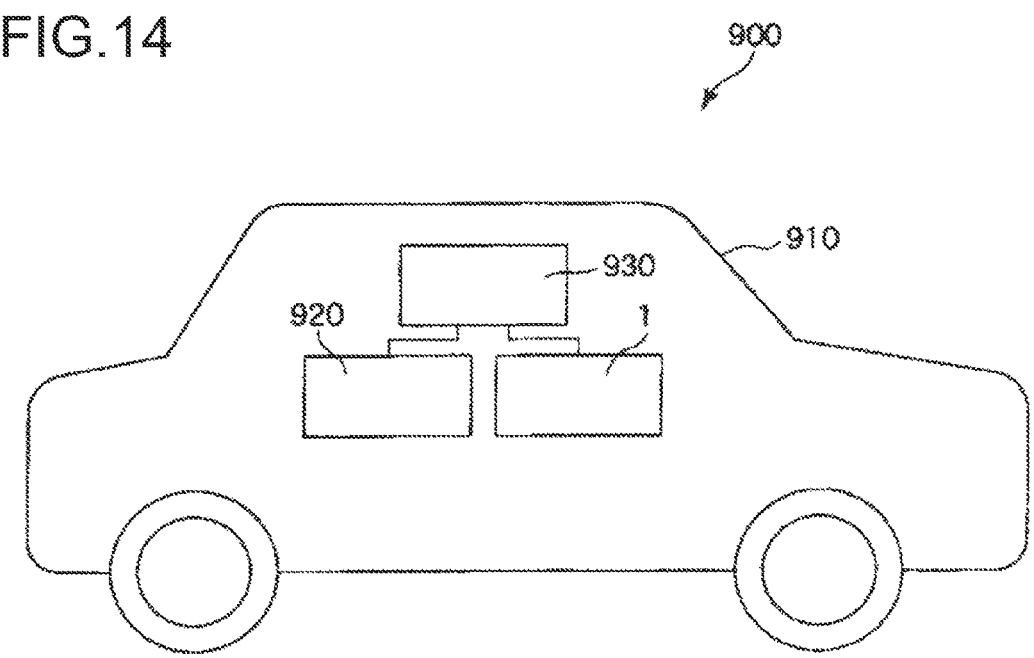

FORCE DETECTION DEVICE, ROBOT, AND MOVING OBJECT

BACKGROUND

1. Technical Field

The present invention relates to a force detection device, a robot, and a moving object.

2. Related Art

In recent years, for the purpose of an improvement in production efficiency, the introduction of industrial robots to production facilities such as a factory has progressed. Such industrial robots include an arm capable of being driven in one-axis or plural-axis directions, and an end effector, such as a hand, a component inspection instrument or a component transport instrument, which is installed at the tip side of the arm, and can execute component assembly work, component manufacturing work such as component machining work, component transport work, component inspection work, and the like.

In such industrial robots, a force detection device is provided between the arm and the end effector. As a force detection device used in the industrial robots, for example, a force detection device disclosed in JP-A-5-95237 is used. The force detection device of JP-A-5-95237 is constituted by a charge output element that outputs charge in accordance with a received external force, an amplifier that amplifies the charge which is output from the charge output element, a capacitor for converting the charge which is output from the charge output element into a voltage, and a reset circuit having a mechanical relay for short-circuiting terminals of the capacitor and resetting charge accumulated in the capacitor. With such a configuration, the force detection device of JP-A-5-95237 can detect an external force applied along any one axis to the charge output element.

However, in order to control the end effector of the industrial robot, it may be necessary to detect six-axis forces (translational force components in the directions of x, y, and z axes and rotational force components around the x, y, and z axes). In such a case, it is necessary to form a three-axis force detection device capable of detecting three-axis forces (translational forces in the directions of the x, y, and z axes) by combining at least three force detection devices as disclosed in JP-A-5-95237, and to mount at least three three-axis force detection devices to the wrist of the industrial robot.

When the size of the force detection device mounted to the wrist of such an industrial robot is large, the operating area of the wrist may become narrower. In addition, when the size of the force detection device is large, the distance from the joint of the industrial robot to the end of the end effector becomes longer, and thus the load capacity of the industrial robot may be reduced. Therefore, it is preferable that the force detection device is small in size and light in weight.

In order to solve such problems, various methods are proposed. For example, JP-A-11-148878 discloses a force detection device using a semiconductor switching element as a reset circuit. Since the semiconductor switching element is smaller in size and lighter in weight than the mechanical relay, it is possible to reduce the size and weight of the entire device by using the semiconductor switching element as the reset circuit.

However, when the semiconductor switching element is used as the reset circuit, an output drift due to a leakage current of the semiconductor switching element is generated. Such an output drift deteriorates the detection resolution and detection accuracy of the force detection device, which leads to undesirable results. Further, since the output drift is accumulated in proportion to the measurement (operating) time of the force detection device, there is a problem in that the measurable time of the force detection device cannot be lengthened.

In addition, as the force detection device, a quartz crystal piezoelectric sensor using quartz crystal as a charge output element is widely used. The quartz crystal piezoelectric sensor has characteristics excellent in a wide dynamic range, high rigidity, high natural frequency, and high load bearing capacity, and thus is widely used in the industrial robot.

However, in such a quartz crystal piezoelectric sensor, charge which is output from quartz crystal is weak, and thus it is not possible to ignore the influence of an output drift caused by the leakage current of a conversion and output circuit. Various methods for reducing the output drift have been examined. For example, JP-A-9-72757 discloses a quartz crystal piezoelectric sensor provided with a reverse bias circuit using a diode having current characteristics similar to the characteristics of the leakage current of the conversion and output circuit. In the quartz crystal piezoelectric sensor disclosed in JP-A-9-72757, a correction current which has a size substantially equal to that of the leakage current of the conversion and output circuit and of which the flow direction is opposite thereto is supplied from the diode, and thus an output drift is reduced.

However, when the reverse bias circuit is used as in the quartz crystal piezoelectric sensor disclosed in JP-A-9-72757, additional components such as the diode are required, and the mounting area thereof is expanded, which leads to the difficulty of a reduction in size. In addition, there is a problem in that component quality control for supplying a desired correction current is required.

SUMMARY

An advantage of some aspects of the invention is to provide a force detection device having a small size and a reduced output drift, a robot using the force detection device, and a moving object.

An aspect of the invention is directed to a force detection device including: a charge output element that outputs charge in accordance with an external force; a conversion and output circuit, having a first capacitor, which converts the charge into a voltage and outputs the voltage; a compensation signal output circuit, having a second capacitor, which outputs a compensation signal; and an external force detection circuit that detects the external force on the basis of the voltage which is output from the conversion and output circuit and the compensation signal which is output from the compensation signal output circuit. A capacitance of the second capacitor is smaller than a capacitance of the first capacitor.

With this configuration, it is possible to compensate for the voltage which is output from the conversion and output circuit, using the compensation signal which is output by the compensation signal output circuit. As a result, it is possible to perform higher-accuracy force detection. In addition, since the capacitance of the second capacitor is smaller than the capacitance of the first capacitor, the compensation signal output circuit can more accurately acquire the compensation signal from the second switching element. As a result, it is possible to more accurately compensate for the voltage which is output from the conversion and output circuit.

In the force detection device, it is preferable that when the capacitance of the first capacitor is set to $C1$, and the capacitance of the second capacitor is set to $C2$, $C2/C1$ is 0.1 to 0.8.

When the capacitance ratio $C2/C1$ falls below the lower limit, the second capacitor may be saturated. On the other hand, when the capacitance ratio C2/C1 exceeds the upper limit, the compensation signal may not be able to be accurately acquired from the second switching element.

In the force detection device, it is preferable that the external force detection circuit includes a gain correction portion that gives a gain to at least one of the voltage which is output from the conversion and output circuit and the compensation signal which is output from the compensation signal output circuit, to perform correction, and the external force detection circuit detects the external force on the basis of the voltage corrected by the gain correction portion and the compensation signal.

With this configuration, it is possible to correct a sensitivity difference between the voltage and the compensation signal which is caused by the difference between the capacitance C1 of the first capacitor and the capacitance C2 of the second capacitor.

Another aspect of the invention is directed to a force detection device including: a first element and a second element that output voltages in accordance with an external force; and an external force detection circuit that detects the external force on the basis of the voltages which are output from the first element and the second element. The first element and the second element include a piezoelectric substance, having an electric axis, which outputs charge in accordance with the external force along the electric axis, and a conversion and output circuit that converts the charge which is output from the piezoelectric substance into the voltage. The first element and the second element are disposed so that a direction of the electric axis included in the piezoelectric substance of the first element and a direction of the electric axis included in the piezoelectric substance of the second element are opposite to each other.

With this configuration, the sign of the output drift included in the voltage which is output from the first element and the sign of the output drift included in the voltage which is output from the second element are consistent with each other, but it is possible to reverse the sign of a voltage component (true value), included in the voltage which is output from the first element, which is proportional to the accumulated amount of the charge which is output from the piezoelectric substance in accordance with the external force and the sign of a voltage component (true value), included in the voltage which is output from the second element, which is proportional to the accumulated amount of the voltage which is output from the piezoelectric substance in accordance with the external force. Therefore, the external force is calculated using the voltage which is output from the first element and the voltage which is output from the second element, and thus it is possible to detect the external force while reducing the output drift included in the voltages which are output from the first element and second element. As a result, it is possible to improve the detection accuracy and detection resolution of the force detection device. Further, since a circuit, such as a reverse bias circuit, for reducing the output drift is not required, it is possible to reduce the size of the force detection device.

In the force detection device, it is preferable that the first element and the second element are disposed so that the direction of the electric axis of the piezoelectric substance of the first element and the direction of the electric axis of the piezoelectric substance of the second element face each other on the same axis.

With this configuration, it is possible to detect the external force while further reducing the output drift.

In the force detection device, it is preferable that each of the piezoelectric substances includes: a first piezoelectric plate which has a first crystal axis; a second piezoelectric plate, provided facing the first piezoelectric plate, which has a second crystal axis; and an internal electrode provided between the first piezoelectric plate and the second piezoelectric plate, and the first crystal axis of the first piezoelectric plate has a polarity different from that of the second crystal axis of the second piezoelectric plate.

With this configuration, it is possible to increase positive charge or negative charge collected in the vicinity of the internal electrode.

In the force detection device, it is preferable that the external force detection portion detects the external force applied to the force detection device by taking a difference between the voltages converted from the charge which is output from the first element and the second element.

With this configuration, it is possible to reduce a detection error caused by the output drift.

In the force detection device, it is preferable that when a lamination direction of the piezoelectric substance is set to a $\gamma$-axis direction, and directions which are orthogonal to the $\gamma$-axis direction and are orthogonal to each other are set to an $\alpha$-axis direction and a $\beta$-axis direction, respectively, one of the piezoelectric substances is an $\alpha$-axis piezoelectric substance that outputs the charge in accordance with the external force along the $\alpha$-axis direction, one of the piezoelectric substances is a $\beta$-axis piezoelectric substance that outputs the charge in accordance with the external force along the $\beta$-axis direction, and one of the piezoelectric substances is a $\gamma$-axis piezoelectric substance that outputs the charge in accordance with the external force along the $\gamma$-axis direction.

With this configuration, the piezoelectric substances can output the charge in accordance with three-axis forces (translational force components in the directions of the x, y, and z axes).

In the force detection device, it is preferable that the force detection device includes two first elements and two second elements, the direction of the electric axis of the $\alpha$-axis piezoelectric substance of one of the first elements and one of the second elements is opposite to the direction of the electric axis of the $\alpha$-axis piezoelectric substance of the other of the first elements and the other of the second elements, and the direction of the electric axis of the $\gamma$-axis piezoelectric substance of the one of the first elements and the one of the second elements is opposite to the direction of the electric axis of the $\gamma$-axis piezoelectric substance of the other of the first elements and the other of the second elements.

With this configuration, it is possible to detect six-axis forces while reducing the output drift on the basis of the voltages which are output from the first element and the second element.

In the force detection device, it is preferable that the force detection device includes a base plate and a cover plate provided separately from the base plate, to which the external force is given, and each of the elements is provided between the base plate and the cover plate.

With this configuration, it is possible to detect the external force applied to the base plate or the cover plate.

In the force detection device, it is preferable that each of the elements is disposed at equal angular intervals along a circumferential direction of the base plate or the cover plate.

With this configuration, it is possible to detect the external force in an unbiased manner.

Still another aspect of the invention is directed to a robot including: at least one arm connecting body having a plurality of arms and configured to rotatably connect adjacent arms of the plurality of arms; an end effector provided at a tip side of the arm connecting body; and the force detection device of any of the configurations described above, which is provided between the arm connecting body and the end effector and detects an external force applied to the end effector.

In the robot, the external force detected by the force detection device is fed back, and thus it is possible to more precisely execute work. In addition, it is possible to detect the contact of the end effector to an obstacle, and the like, through the external force detected by the force detection device. Therefore, it is possible to easily perform an obstacle avoidance operation, an object damage avoidance operation and the like which are difficult to perform in the position control of the related art, and to execute work more safely.

Yet another aspect of the invention is directed to a moving object including: a power output portion that supplies power for movement; and the force detection device of any of the configurations described above, which detects an external force generated by the movement.

In the moving object, it is possible to detect an external force caused by vibration, acceleration and the like which are generated with the movement, and the moving object can execute control such as posture control, vibration control and acceleration control. Further, since a circuit, such as a reverse bias circuit, for reducing the output drift is not required, it is possible to reduce the size of the force detection device. Therefore, it is possible to reduce the size of the moving object.

BRIEF DESCRIPTION OF THE DRAWINGS

The invention will be described with reference to the accompanying drawings, wherein like numbers reference like elements.

FIGS. 3A and 3B are a plan view and a cross-sectional view, respectively, illustrating a mounting example of capacitors of the force detection device shown in FIG. 1.

FIG. 13 is a diagram illustrating an example of a single-arm robot using the force detection device according to the invention.

FIG. 14 is a diagram illustrating an example of a moving object using the force detection device according to the invention.

DESCRIPTION OF EXEMPLARY EMBODIMENTS

Hereinafter, a force detection device according to the invention will be described in detail on the basis of preferred embodiments shown in the accompanying drawings.

First Embodiment

Figure 1:
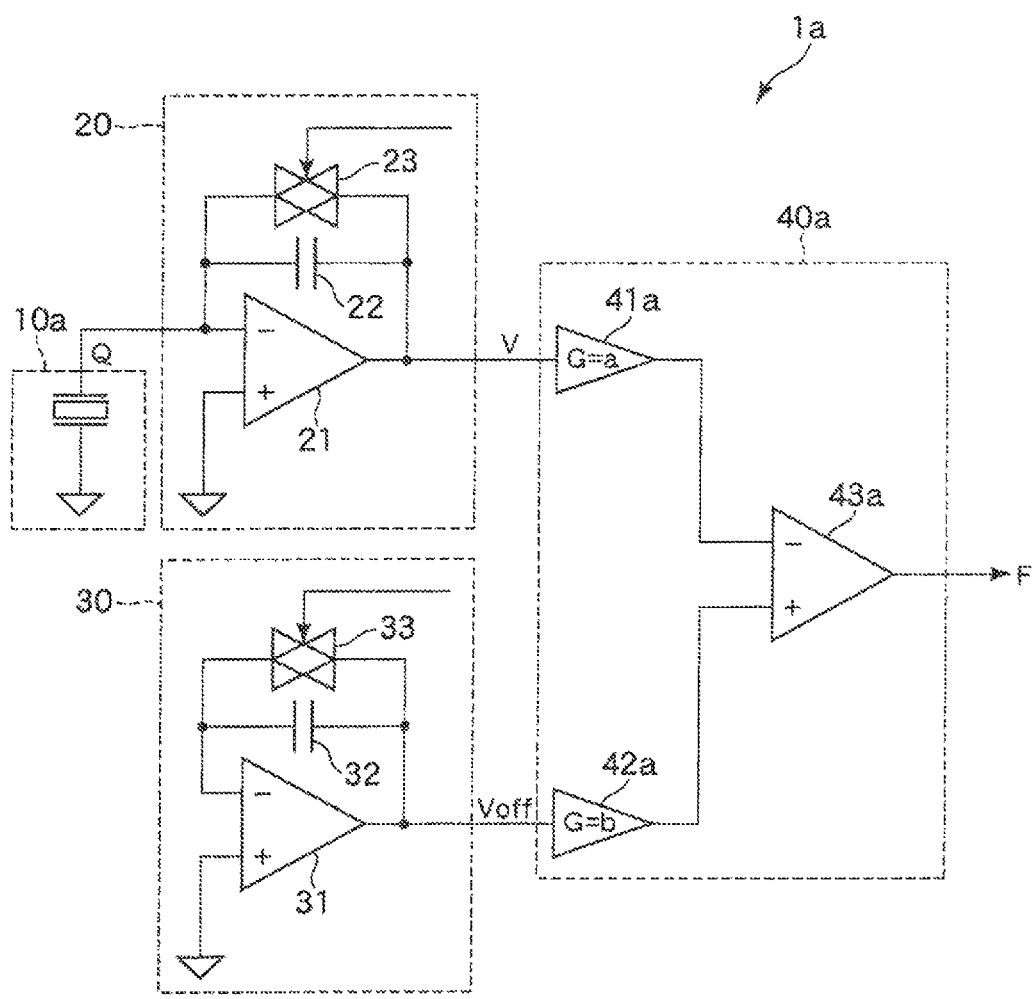
FIG. 1 is a circuit diagram schematically illustrating a first embodiment of a force detection device according to the invention.
Figure 2:
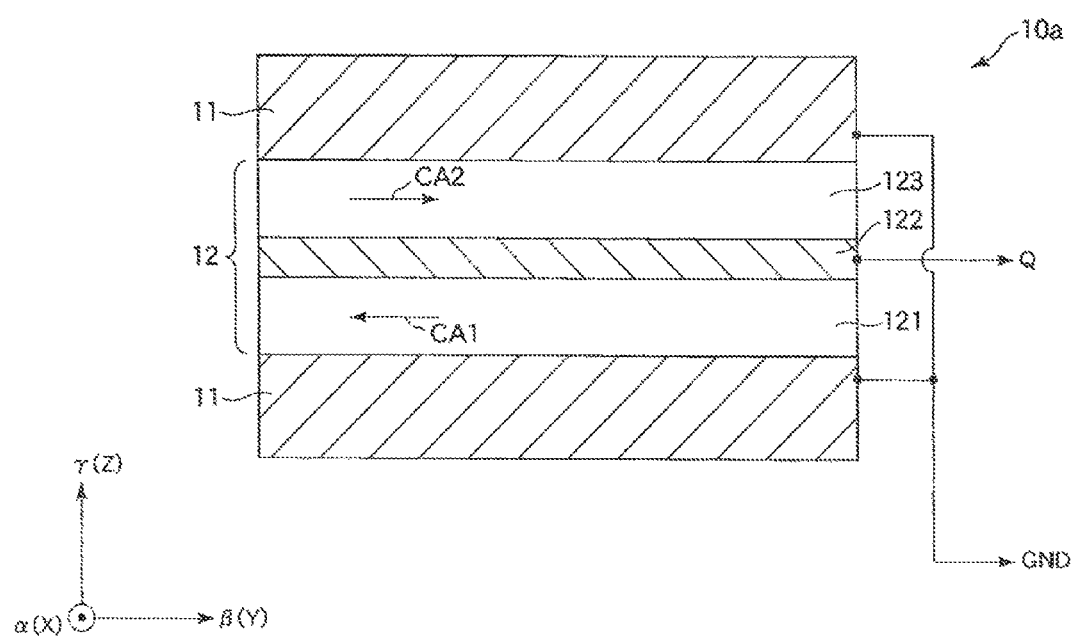
FIG. 2 is a cross-sectional view schematically illustrating a charge output element of the force detection device shown in FIG. 1.

FIG. 1 is a circuit diagram schematically illustrating a first embodiment of the force detection device according to the invention. FIG. 2 is a cross-sectional view schematically illustrating a charge output element of the force detection device shown in FIG. 1. FIGS. 3A and 3B are diagrams illustrating a mounting example of capacitors of the force detection device shown in FIG. 1; FIG. 1A is a plan view, and FIG. 1B is a cross-sectional view.

A force detection device $1a$ shown in FIG. 1 has a function of detecting an external force applied along any one axis (x-axis, y-axis or z-axis). The force detection device $1a$ includes a charge output element $10a$ that outputs charge Q in accordance with an external force applied (received) along any one axis, a conversion and output circuit 20 that converts the charge Q which is output from the charge output element $10a$ into a voltage V and outputs the voltage V, a compensation signal output circuit 30 that outputs a compensation signal Voff, and an external force detection circuit $40a$ that detects the applied external force on the basis of the voltage V which is output from the conversion and output circuit 20 and the compensation signal Voff which is output from the compensation signal output circuit 30.

Charge Output Element

The charge output element $10a$ shown in FIG. 2 has a function of outputting the charge Q in accordance with an external force (shearing force) applied (received) along a β-axis in FIG. 2. The charge output element $10a$ includes two ground electrode layers 11 and a piezoelectric substance 12 provided between the two ground electrode layers 11. Meanwhile, in FIG. 2, the lamination direction of the ground electrode layers 11 and the piezoelectric substance 12 is set to a γ-axis direction, and the directions which are orthogonal to the γ-axis direction and are orthogonal to each other are set to an α-axis direction and a β-axis direction, respectively.

In the shown configuration, both the ground electrode layer 11 and the piezoelectric substance 12 have the same width (length in a horizontal direction in the drawing), but the invention is not limited thereto. For example, the width of the ground electrode layer 11 may be greater than the width of the piezoelectric substance 12, or vice versa.

The ground electrode layer 11 is an electrode grounded to a ground (reference potential point) GND. Materials constituting the ground electrode layer 11, though not particularly limited, are preferably, for example, gold, titanium, aluminum, copper, iron or an alloy containing these materials. Among these materials, particularly, it is preferable to use stainless steel which is an iron alloy. The ground electrode layer 11 formed of stainless steel has excellent durability and corrosion resistance.

The piezoelectric substance 12 has a function of outputting the charge Q in accordance with the external force (shearing force) applied (received) along the β-axis. The piezoelectric substance 12 is configured to output positive charge in accordance with an external force applied along the positive direction of the β-axis, and to output negative charge in accordance with an external force applied along the negative direction of the β-axis.

The piezoelectric substance 12 includes a first piezoelectric plate 121 having a first crystal axis CA1, a second piezoelectric plate 123, provided facing the first piezoelectric plate 121, which has a second crystal axis CA2, and an internal electrode 122, provided between the first piezoelectric plate 121 and the second piezoelectric plate 123, which outputs the charge Q.

The first piezoelectric plate 121 is constituted by a piezoelectric substance having the first crystal axis CA1 oriented in the negative direction of the β-axis. When the external force along the positive direction of the β-axis is applied to the surface of the first piezoelectric plate 121, charge is induced into the first piezoelectric plate 121 by a piezoelectric effect. As a result, positive charge is collected in the vicinity of the surface of the first piezoelectric plate 121 on the internal electrode 122 side, and negative charge is collected in the vicinity of the surface of the first piezoelectric plate 121 on the ground electrode layer 11 side. Similarly, when the external force along the negative direction of the β-axis is applied to the surface of the first piezoelectric plate 121, negative charge is collected in the vicinity of the surface of the first piezoelectric plate 121 on the internal electrode 122 side, and positive charge is collected in the vicinity of the surface of the first piezoelectric plate 121 on the ground electrode layer 11 side.

The second piezoelectric plate 123 is constituted by a piezoelectric substance having the second crystal axis CA2 oriented in the positive direction of the β-axis. When the external force along the positive direction of the β-axis is applied to the surface of the second piezoelectric plate 123, charge is induced into the second piezoelectric plate 123 by a piezoelectric effect. As a result, positive charge is collected in the vicinity of the surface of the second piezoelectric plate 123 on the internal electrode 122 side, and negative charge is collected in the vicinity of the surface of the second piezoelectric plate 123 on the ground electrode layer 11 side. Similarly, when the external force along the negative direction of the β-axis is applied to the surface of the second piezoelectric plate 123, negative charge is collected in the vicinity of the surface of the second piezoelectric plate 123 on the internal electrode 122 side, and positive charge is collected in the vicinity of the surface of the second piezoelectric plate 123 on the ground electrode layer 11 side.

In this manner, the direction of the first crystal axis CA1 of the first piezoelectric plate 121 is opposite to the direction of the second crystal axis CA2 of the second piezoelectric plate 123. Thereby, it is possible to increase the positive charge or the negative charge collected in the vicinity of the internal electrode 122, as compared with a case where the piezoelectric substance 12 is constituted by only any one of the first piezoelectric plate 121 and the second piezoelectric plate 123, and the internal electrode 122. As a result, it is possible to increase the charge Q which is output from the internal electrode 122.

Meanwhile, constituent materials of the first piezoelectric plate 121 and the second piezoelectric plate 123 include quartz crystal, topaz, barium titanate, lead titanate, lead zirconate titanate (PZT: $Pb(Zr,Ti)O_3$), lithium niobate, lithium tantalite, and the like. Among these materials, particularly, quartz crystal is preferable. This is because a piezoelectric plate formed of quartz crystal has characteristics excellent in a wide dynamic range, high rigidity, high natural frequency, and high load bearing capacity. In addition, a piezoelectric plate, such as the first piezoelectric plate 121 and the second piezoelectric plate 123, which generates charge by an external force (shearing force) applied along the surface direction of the layer can be formed of Y cut quartz crystal.

The internal electrode 122 has a function of outputting positive charge or negative charge, generated within the first piezoelectric plate 121 and the second piezoelectric plate 123, as the charge Q. As described above, when the external force along the positive direction of the β-axis is applied to the surface of the first piezoelectric plate 121 or the surface of the second piezoelectric plate 123, positive charge is collected in the vicinity of the internal electrode 122. As a result, positive charge Q is output from the internal electrode 122. On the other hand, when the external force along the negative direction of the β-axis is applied to the surface of the first piezoelectric plate 121 or the surface of the second piezoelectric plate 123, negative charge is collected in the vicinity of the internal electrode 122. As a result, negative charge Q is output from the internal electrode 122.

In addition, the width of the internal electrode 122 is preferably equal to or greater than the widths of the first piezoelectric plate 121 and the second piezoelectric plate 123. When the width of the internal electrode 122 is smaller than that of the first piezoelectric plate 121 or the second piezoelectric plate 123, a portion of the first piezoelectric plate 121 or the second piezoelectric plate 123 is not in contact with the internal electrode 122. For this reason, a portion of charge generated in the first piezoelectric plate 121 or the second piezoelectric plate 123 may not be able to be output from the internal electrode 122. As a result, the charge Q which is output from the internal electrode 122 decreases.

In this manner, the charge output element 10a includes the ground electrode layer 11 and the piezoelectric substance 12 mentioned above, and thus can output the charge Q in accordance with the external force parallel or substantially parallel to the β-axis in FIG. 2.

Meanwhile, an example has been described in which the charge output element 10a has a function of outputting the charge Q in accordance with the external force (shearing force) parallel or substantially parallel to the β-axis, but the invention is not limited thereto. By using the first piezoelectric plate 121 in which the orientation direction of the first crystal axis CA1 is different from the β-axis direction and the second piezoelectric plate 123 in which the orientation direction of the second crystal axis CA2 is different from the β-axis direction, it is possible to form the charge output element 10a that outputs the charge Q in accordance with an external force (shearing force) parallel or substantially parallel to an α-axis or an external force (compressive/tensile force) parallel or substantially parallel to a γ-axis. Such a case is also within the scope of the invention.

Conversion and Output Circuit

The conversion and output circuit 20 has a function of converting the charge Q which is output from the charge output element 10a into a voltage V and outputting the voltage V. The conversion and output circuit 20 includes an operational amplifier 21, a capacitor 22 as a first capacitor, and a switching element 23. A first input terminal (negative input) of the operational amplifier 21 is connected to the internal electrode 122 of the charge output element 10a, and a second input terminal (positive input) of the operational amplifier 21 is grounded to a ground (reference potential point). In addition, an output terminal of the operational amplifier 21 is connected to the external force detection circuit 40a. The capacitor 22 is connected between the first input terminal and the output terminal of the operational amplifier 21. The switching element 23 is connected between the first input terminal and the output terminal of the operational amplifier 21, and is connected in parallel with the capacitor 22. In addition, the switching element 23 is connected to a drive circuit (not shown), and the switching element 23 executes a switching operation in accordance with an on/off signal from the drive circuit.

When the switching element 23 is turned off, the charge Q which is output from the charge output element 10a is accumulated in the capacitor 22 having a capacitance C1, and is output to the external force detection circuit 40a as the voltage V. Next, when the switching element 23 is turned on, both terminals of the capacitor 22 are short-circuited therebetween. As a result, the charge Q accumulated in the capacitor 22 is discharged to be held at 0 coulombs, and the voltage V which is output to the external force detection circuit 40a is held at 0 volts. The turn-on of the switching element 23 refers to the resetting of the conversion and output circuit 20.

The switching element 23 is a semiconductor switching element such as a MOSFET (Metal Oxide Semiconductor Field Effect Transistor). A semiconductor switching element is smaller in size and lighter in weight than a mechanical switch, and thus has an advantage in reducing the size and weight of the force detection device 1a. Hereinafter, as a representative example, a case where a MOSFET is used as the switching element 23 will be described.

The switching element 23 has a drain electrode, a source electrode, and a gate electrode. One of the drain electrode and the source electrode of the switching element 23 is connected to the first input terminal of the operational amplifier 21, and the other of the drain electrode and the source electrode is connected to the output terminal of the operational amplifier 21. In addition, a gate electrode of the switching element 23 is connected to a drive circuit (not shown).

The voltage V which is output from the ideal conversion and output circuit 20 is proportional to the accumulated amount of the charge Q which is output from the charge output element 10a. However, in the actual conversion and output circuit 20, a leakage current flowing from the switching element 23 into the capacitor 22 is generated. Such a leakage current acts as an output drift D included in the voltage V. Therefore, when a voltage component (true value) proportional to the accumulated amount of the charge Q is set to Vt, the output voltage V satisfies the relation of V=Vt+D.

Since the output drift D is equivalent to an error on a measurement result, there is a problem in that the detection accuracy and detection resolution of the force detection device 1a deteriorate. In addition, since the leakage current is accumulated in proportion to the measurement (drive) time, there is a problem in that the measurement time of the force detection device 1a cannot be lengthened.

Such a leakage current is caused by semiconductor structures such as the lack of insulation properties of a gate insulating film, the refinement of a process rule, and the variation of impurity concentration in a semiconductor, and use environments such as temperature and humidity. The leakage current caused by the semiconductor structure serves as an eigenvalue for each switching element, and thus can be compensated for relatively easily by measuring the leakage current caused by the semiconductor structure in advance. However, since the leakage current caused by the use environment fluctuates depending on the use environment (conditions), it is not likely that the leakage current will be compensated for. The force detection device 1a of the embodiment can reduce (compensate for) the influences of the leakage current caused by the semiconductor structure and the leakage current caused by the use environment, using the compensation signal Voff which is output from the compensation signal output circuit 30 as described next.

Compensation Signal Output Circuit

The compensation signal output circuit 30 has a function of outputting the compensation signal Voff for compensating for the voltage V which is output from the conversion and output circuit 20. As shown in the drawing, the compensation signal output circuit 30 may be provided independently of the conversion and output circuit 20. The phrase "provided independently" as used herein refers to the fact that components (operational amplifier 31, capacitor 32 as a second capacitor and switching element 33 which are described later) of the compensation signal output circuit 30 and components (that is, operational amplifier 21, capacitor 22 and switching element 23) of the conversion and output circuit 20 are elements (components) different from each other. That is, the compensation signal output circuit 30 is provided separately from the conversion and output circuit 20, and does not share the components thereof with the conversion and output circuit.

The compensation signal output circuit 30 includes the operational amplifier 31, the capacitor 32 as a second capacitor, and the switching element 33. A first input terminal (negative input) of the operational amplifier 31 is connected to the capacitor 32 and the switching element 33, and an input terminal (positive input) of the operational amplifier 31 is grounded to a ground (reference potential point). In addition, an output terminal of the operational amplifier 31 is connected to the external force detection circuit 40a. The capacitor 32 is connected between the input terminal and the output terminal of the operational amplifier 31. The switching element 33 is connected between the first input terminal and the output terminal of the operational amplifier 31, and is connected in parallel with the capacitor 32. In addition, the switching element 33 is connected to a drive circuit (not shown), and the switching element 33 executes a switching operation in accordance with an on/off signal from the drive circuit.

The switching element 33 is the same semiconductor switching element (MOSFET) as the switching element 23 of the conversion and output circuit 20. The switching element 33 has a drain electrode, a source electrode, and a gate electrode. One of the drain electrode and the source electrode of the switching element 33 is connected to the first input terminal of the operational amplifier 31, and the other of the drain electrode and the source electrode is connected to the output terminal of the operational amplifier 31. In addition, the gate electrode of the switching element 33 is connected to a drive circuit (not shown).

The drive circuit connected to the switching element 33 may be the same drive circuit as the drive circuit connected to the switching element 23 of the conversion and output circuit 20, and may be a different drive circuit. When the drive circuit connected to the switching element 33 and the drive circuit connected to the switching element 23 are drive circuits different from each other, the drive circuit connected to the switching element 33 outputs an on/off signal synchronous with the drive circuit connected to the switching element 23. Thereby, the switching operation of the switching element 33 and the switching operation of the switching element 23 are synchronized with each other. That is, the on/off timings of the switching element 33 and the switching element 23 are consistent with each other.

The switching element 33 is the same semiconductor switching element as the switching element 23 of the conversion and output circuit 20. Therefore, the leakage current caused by the semiconductor structure of the switching element 33 is substantially equal to the leakage current caused by the semiconductor structure of the switching element 23. The phrase "substantially equal" as used herein means that the difference between the leakage current caused by the semiconductor structure of the switching element 33 and the leakage current caused by the semiconductor structure of the switching element 23 is sufficiently small to the extent of being negligible as compared with the leakage currents caused by the semiconductor structures of the switching elements 23 and 33.

In addition, the switching element 33 is mounted under the same use environment as that of the switching element 23 of the conversion and output circuit 20. The phrase "use environment" as used herein refers to temperature and humidity. Thereby, it is possible to make the leakage current caused by the use environment of the switching element 33 and the leakage current caused by the use environment of the switching element substantially equal to each other. The phrase "substantially equal" as used herein means that the difference between the leakage current caused by the use environment of the switching element 33 and the leakage current caused by the use environment of the switching element 23 is sufficiently small to the extent of being negligible as compared with the leakage currents caused by the use environments of the switching elements 23 and 33.

As a result, the leakage current of the switching element 33 operates simultaneously with the leakage current of the switching element 23. That is, when the leakage current of the switching element 23 increases, the leakage current of the switching element 33 increases similarly. When the leakage current of the switching element 23 decreases, the leakage current of the switching element 33 decreases similarly. Thereby, the compensation signal output circuit 30 detects the leakage current of the switching element 33, thereby allowing the leakage current of the switching element 23 to be indirectly acquired.

The phrase "under the same use environment" as mentioned above includes, for example, a case where the switching element 33 is mounted in the vicinity of the switching element 23, a case where the switching element 23 and the switching element 33 are mounted in the same housing, a case where the switching element 23 and the switching element 33 are mounted on the same semiconductor substrate, and the like.

Among these cases, it is preferable that the switching element 23 and the switching element 33 are mounted on the same semiconductor substrate. The switching element 23 and the switching element 33 are mounted on the same semiconductor substrate, thereby allowing the temperature and humidity around the switching element 23 and the temperature and humidity around the switching element 33 to be easily made substantially equal to each other. The phrase "substantially equal" as used herein means that the difference between the temperature and humidity around the switching element 33 and the temperature and humidity of the switching element 23 is sufficiently small to the extent of being negligible.

In addition, when the switching element 23 and the switching element 33 are mounted on the same semiconductor substrate, the switching element 23 and the switching element 33 can be formed in the same process, which leads to the advantage of shortening a working process. In addition, since the switching element 23 and the switching element 33 can be formed in the same process, it is possible to suppress a variation in the characteristics of the switching element 23 and the switching element 33. Therefore, the leakage current caused by the semiconductor structure of the switching element and the leakage current caused by the semiconductor structure of the switching element 33 can be made equal to each other with a higher degree of accuracy.

When the switching element 33 is turned off, the leakage current generated in the switching element 33 flows into the capacitor 32 having a capacitance C2. Thereby, charge is accumulated, and thus is output to the external force detection circuit 40a as the compensation signal Voff. Next, when the switching element 33 is turned on, both terminals of the capacitor 32 are short-circuited therebetween. As a result, the charge Q accumulated in the capacitor 32 is discharged to be held at 0 coulombs, and the compensation signal Voff which is output to the external force detection circuit 40a is held at 0 volts.

When the capacitance of a capacitor is reduced in the circuit, such as the conversion and output circuit 20 or the compensation signal output circuit 30, which has a voltage conversion function, voltage conversion sensitivity is improved, but the amount of saturated charge is reduced. Generally, the leakage currents of the semiconductor switching elements such as the switching elements 23 and 33 are smaller than the charge Q which is input from the charge output element 10a. Therefore, it is preferable that the capacitance C2 of the capacitor 32 is smaller than the capacitance C1 of the capacitor 22. Thereby, the leakage current generated in the switching element 33 can be converted into a voltage more accurately.

In addition, the capacitance ratio C2/C1 of the capacitance C2 of the capacitor 32 to the capacitance C1 of the capacitor 22 is preferably 0.1 to 0.8, and is more preferably 0.3 to 0.6. When the capacitance ratio C2/C1 falls below the lower limit, the capacitor 32 may be saturated by the leakage current generated in the switching element 33. On the other hand, when the capacitance ratio C2/C1 exceeds the upper limit, sufficient sensitivity to the leakage current generated in the switching element 33 may not be obtained.

FIGS. 3A and 3B illustrate an example of a circuit in which two capacitors 22 and 32 having different capacitances are mounted on the same semiconductor substrate. FIG. 3A is a plan view of a circuit having the capacitor 22 and the capacitor 32. Meanwhile, in FIG. 3A, some of the components are shown in perspective for the purpose of description. FIG. 3B is a cross-sectional view taken along line A-A of FIG. 3A. The circuit of FIGS. 3A and 3B includes a semiconductor substrate 50, insulating interlayers 60 and 70 provided on the semiconductor substrate 50, the capacitors 22 and 32 provided on the insulating interlayer 60, power distribution layers 80a and 80b, and through holes 71 provided within the insulating interlayer 70.

The capacitor 22 is electrically connected to the operational amplifier 21 and the switching element 23 which are not shown in FIG. 3A or 3B, through the power distribution layer 80a and the through holes 71. Similarly, the capacitor 32 is electrically connected to the operational amplifier 31 and the switching element 33 which are not shown in FIG. 3A or 3B, through the power distribution layer 80b and the through holes 71.

The capacitor 22 having the capacitance C1 includes a capacitor lower electrode layer 221, two capacitor upper electrode layers 223 facing the capacitor lower electrode layer 221, and a capacitor insulating layer 222 provided between the capacitor lower electrode layer 221 and the capacitor upper electrode layers 223.

The capacitor 32 having the capacitance C2 includes a capacitor lower electrode layer 421, a capacitor upper electrode layer 423 facing the capacitor lower electrode layer 421, and a capacitor insulating layer 422 provided between the capacitor lower electrode layer 421 and the capacitor upper electrode layer 423.

The capacitance of a capacitor having structures such as the capacitor 22 and the capacitor 32 is proportional to the area of the capacitor upper electrode layer. In the shown configuration, the area of the capacitor upper electrode layer 423 of the capacitor 32 is smaller than the area of the capacitor upper electrode layer 223 of the capacitor 22. With such a configuration, two capacitors 22 and 32 having different capacitances can be mounted on the same semiconductor substrate 50.

The mounting example of two capacitors 22 and 32 having different capacitances has been described with reference to FIGS. 3A and 3B, but the invention is not limited thereto. For example, the compensation signal output circuit 30 may have a plurality of capacitors connected in series with each other. Thereby, it is possible to reduce the capacitance of the capacitor of the compensation signal output circuit 30, and to make the capacitance of the capacitor of the compensation signal output circuit 30 smaller than the capacitance of the capacitor of the conversion and output circuit 20. In addition, the conversion and output circuit 20 may have a plurality of capacitors connected in parallel with each other. Thereby, it is possible to increase the capacitance of the capacitor of the conversion and output circuit 20, and to make the capacitance of the capacitor of the compensation signal output circuit 30 smaller than the capacitance of the capacitor of the conversion and output circuit 20. Such a case is also within the scope of the invention.

External Force Detection Circuit

The external force detection circuit 40a has a function of detecting the applied external force on the basis of the voltage V which is output from the conversion and output circuit 20 and the compensation signal Voff which is output from the compensation signal output circuit 30. The external force detection circuit 40a includes an amplifier 41a connected to the conversion and output circuit 20, an amplifier 42a connected to the compensation signal output circuit 30, and a differential amplifier 43a connected to the amplifiers 41a and 42a.

An input terminal of the amplifier 41a is connected to the output terminal of the operational amplifier 21 of the conversion and output circuit 20, and an output terminal of the amplifier 41a is connected to a first input terminal (negative input) of the differential amplifier 43a. An input terminal of the amplifier 42a is connected to the output terminal of the operational amplifier 31 of the compensation signal output circuit 30, and an output terminal of the amplifier 42a is connected to a second input terminal (positive input) of the differential amplifier 43a.

The amplifier 41a has a function of giving a gain G=a to the voltage V which is output from the conversion and output circuit 20, and performing correction. The amplifier 42a has a function of giving a gain G=b to the compensation signal Voff which is output from the compensation signal output circuit 30, and performing correction.

It is preferable that a gain factor a of the amplifier 41a and a gain factor b of the amplifier 42a satisfy the relational expression of a=C1/C2×b. Here, C1 is the capacitance of the capacitor 22 of the conversion and output circuit 20, and C2 is the capacitance of the capacitor 32 of the compensation signal output circuit 30. Thereby, it is possible to correct the sensitivity difference between the voltage V and the compensation signal Voff which is caused by the difference between the capacitance C1 of the capacitor 22 and the capacitance C2 of the capacitor 32. As a result, the values of the corrected output drift D (that is, a×D) and the corrected compensation signal Voff (that is, b×D) become substantially equal to each other. The phrase "substantially equal" as used herein means that the difference between the corrected output drift D (that is, a×D) and the corrected compensation signal Voff (that is, b×D) is sufficiently small to the extent of being negligible. Meanwhile, a=1 means that the voltage V is not corrected. Similarly, b=1 means that the compensation signal Voff is not corrected.

The differential amplifier 43a has a function of taking the difference between the voltage V corrected by the amplifier 41a and the compensation signal Voff corrected by the amplifier 42a, and outputting a signal F. As described above, the values of the output drift D, included in the corrected voltage V, which is caused by the leakage current and the corrected compensation signal Voff are substantially equal to each other. Therefore, the signal F which is output from an output terminal of the differential amplifier 43a is as follows.

$$F = a \times V - b \times Voff$$
$$= a \times (Vt + D) - b \times Voff$$
$$= a \times Vt + a \times D - b \times Voff$$
$$\approx a \times Vt$$

In this manner, the difference between the corrected voltage V and the corrected compensation signal Voff is taken, and thus it is possible to reduce (remove) the output drift D caused by the leakage current from the corrected voltage V. The external force detection circuit 40a has such a configuration, and thus can output the signal F proportional to the accumulated amount of the charge Q which is output from the charge output element 10a. Since the signal F corresponds to an external force applied to the charge output element 10a, the force detection device 1a can detect the external force applied to the charge output element 10a.

In this manner, the force detection device 1a of the embodiment includes the compensation signal output circuit 30 and the external force detection circuit 40a, and thus can reduce the output drift D caused by the leakage current of the switching element 23 of the conversion and output circuit 20. As a result, it is possible to improve the detection accuracy and detection resolution of the force detection device 1a. In addition, a method of reducing the above-mentioned output drift D is effective even when the measurement time gets longer, and thus it is possible to lengthen the measurement time of the force detection device 1a.

Second Embodiment

Next, a second embodiment of the invention will be described with reference to FIGS. 4 and 5. Hereinafter, the second embodiment will be described with an emphasis on the difference with the above-mentioned first embodiment, and the description of the same particulars will be omitted.

Figure 4:
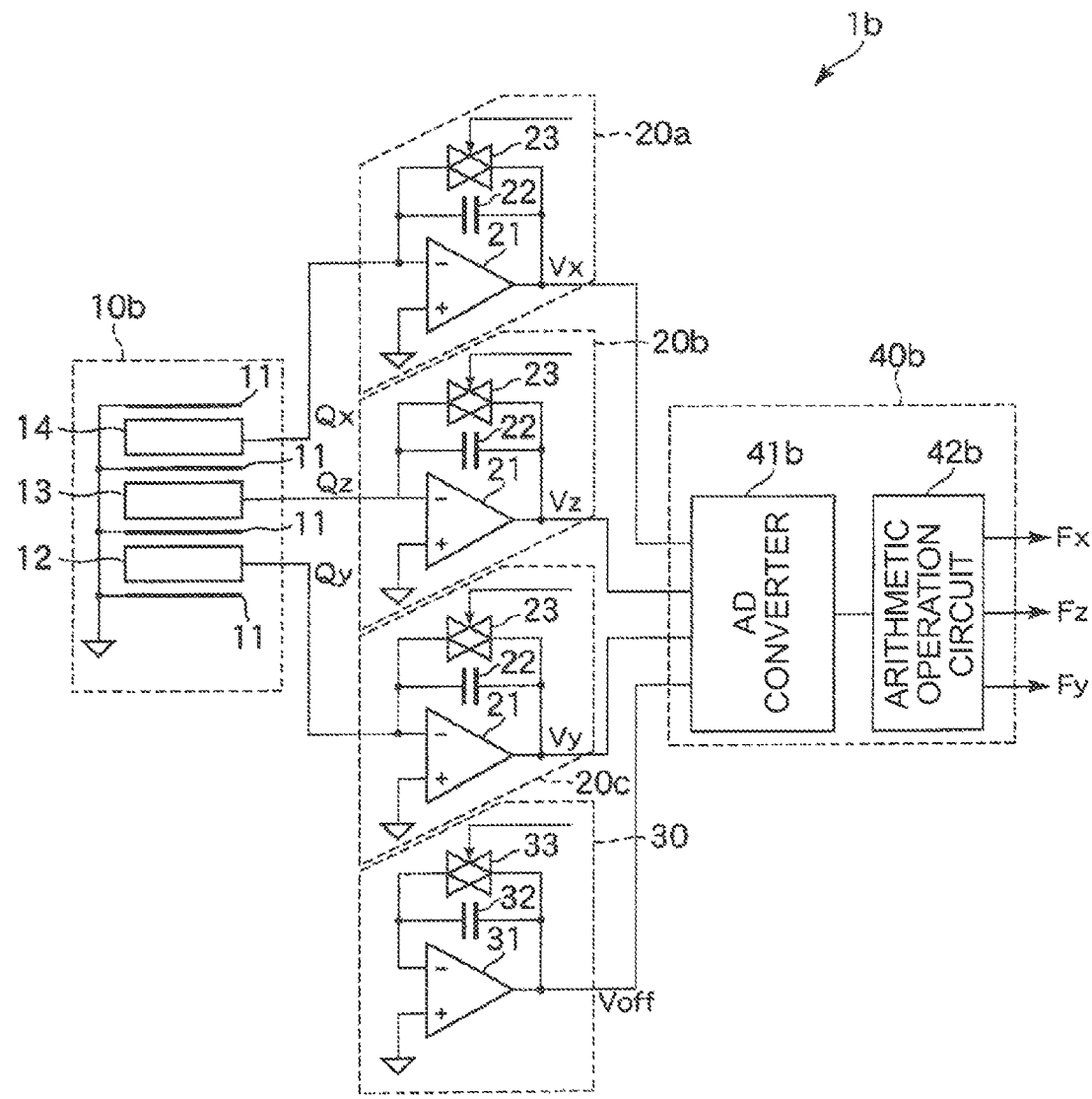
FIG. 4 is a circuit diagram schematically illustrating a second embodiment of the force detection device according to the invention.

FIG. 4 is a circuit diagram schematically illustrating the second embodiment of the force detection device according to the invention. FIG. 5 is across-sectional view schematically illustrating a charge output element of the force detection device shown in FIG. 4.

A force detection device 1b shown in FIG. 4 has a function of detecting external forces applied along three axes (α (X)-axis, β (Y)-axis, and γ (Z)-axis) orthogonal to each other. The force detection device 1b includes a charge output element 10b that outputs three charges Qx, Qy, and Qz in accordance with each external force applied (received) along three axes orthogonal to each other, a conversion and output circuit 20a that converts the charge Qx which is output from the charge output element 10b into a voltage Vx, a conversion and output circuit 20b that converts the charge Qz which is output from the charge output element 10b into a voltage Vz, a conversion and output circuit 20c that converts the charge Qy which is output from the charge output element 10b into a voltage Vy, a compensation signal output circuit 30 that outputs the compensation signal Voff, and an external force detection circuit 40b that detects the applied external force.

Charge Output Element

The charge output element 10b has a function of outputting three charges Qx, Qy, and Qz in accordance with each external force applied (received) along three axes orthogonal to each other. As shown in FIG. 5, the charge output element 10b includes four ground electrode layers 11 grounded to a ground (reference potential point) GND, a first piezoelectric substance 12 as a piezoelectric substance that outputs the charge Qy in accordance with the external force (shearing force) parallel or substantially parallel to the β-axis, a second piezoelectric substance 13 that outputs the charge Qz in accordance with the external force (compressive/tensile force) parallel or substantially parallel to the γ-axis, and a third piezoelectric substance 14 that outputs the charge Qx in accordance with the external force (shearing force) parallel or substantially parallel to the α-axis, and the ground electrode layers 11 and each of the piezoelectric substances 12, 13, and 14 are alternately laminated. Meanwhile, in FIG. 5, the lamination direction of the ground electrode layers 11 and the piezoelectric substances 12, 13, and 14 is set to a γ-axis direction, and the directions which are orthogonal to the γ-axis direction and are orthogonal to each other are set to an α-axis direction and a β-axis direction, respectively.

Figure 5:
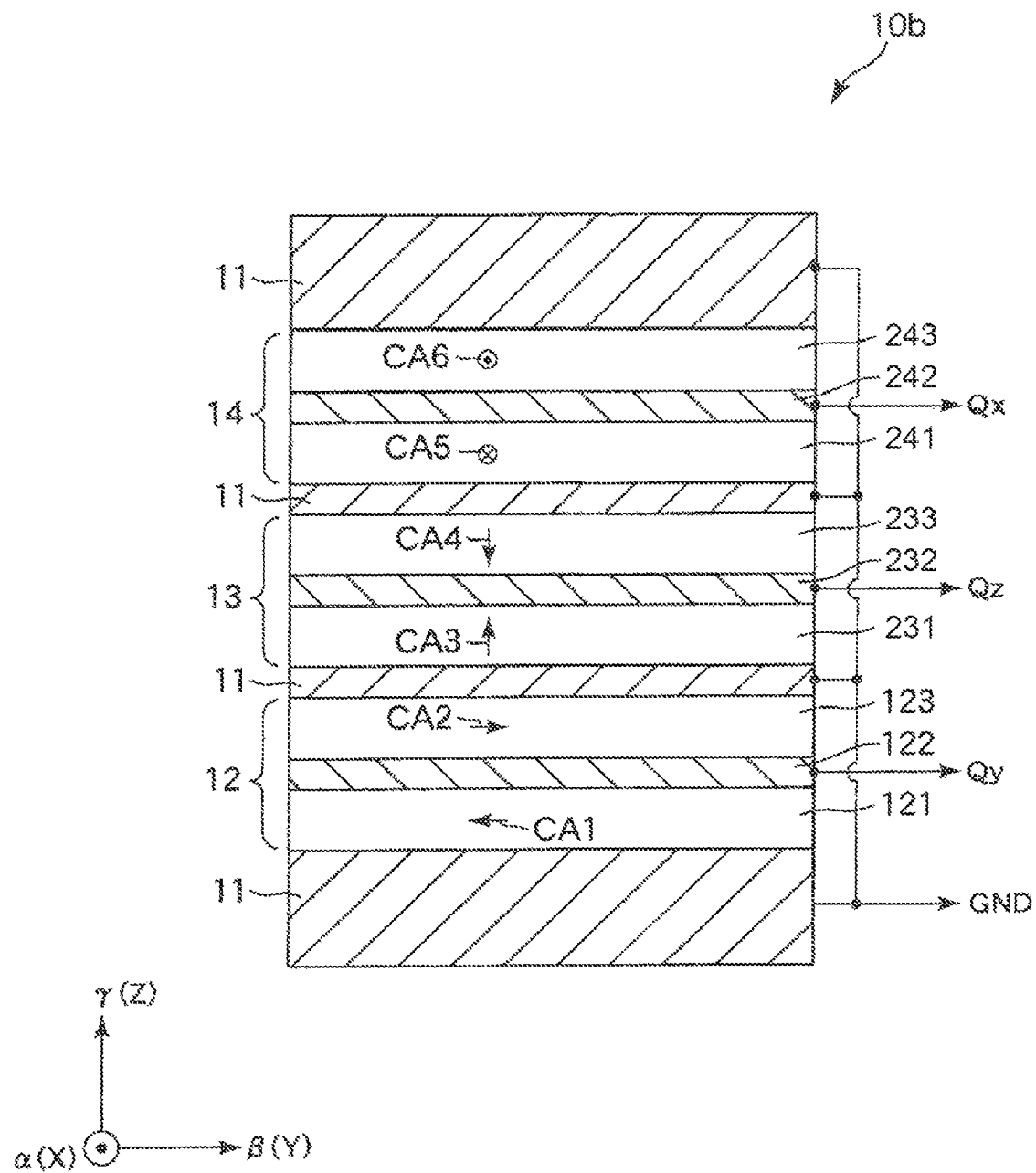
FIG. 5 is a cross-sectional view schematically illustrating a charge output element of the force detection device shown in FIG. 4.

In the shown configuration, the first piezoelectric substance 12, the second piezoelectric substance 13, and the third piezoelectric substance 14 are laminated in this order from the lower side in FIG. 5, but the invention is not limited thereto. The lamination order of the piezoelectric substances 12, 13, and 14 is arbitrary.

The first piezoelectric substance 12 has a function of outputting the charge Qy in accordance with the external force (shearing force) parallel or substantially parallel to the β-axis. The first piezoelectric substance 12 has the same structure and function as those of the piezoelectric substance 12 of the above-mentioned first embodiment.

The second piezoelectric substance 13 has a function of outputting the charge Qz in accordance with the external force (compressive/tensile force) applied (received) along the γ-axis. The second piezoelectric substance 13 is configured to output positive charge in accordance with the compressive force parallel or substantially parallel to the γ-axis, and to output negative charge in accordance with the tensile force parallel or substantially parallel to the γ-axis.

The second piezoelectric substance 13 includes a third piezoelectric plate 231 having a third crystal axis CA3, a fourth piezoelectric plate 233, provided facing the third piezoelectric plate 231, which has a fourth crystal axis CA4, and an internal electrode 232, provided between the third piezoelectric plate 231 and the fourth piezoelectric plate 233, which outputs the charge Qz.

The third piezoelectric plate 231 is constituted by a piezoelectric substance having the third crystal axis CA3 oriented in the positive direction of the γ-axis. When the compressive force parallel or substantially parallel to the γ-axis is applied to the surface of the third piezoelectric plate 231, charge is induced into the third piezoelectric plate 231 by a piezoelectric effect. As a result, positive charge is collected in the vicinity of the surface of the third piezoelectric plate 231 on the internal electrode 232 side, and negative charge is collected in the vicinity of the surface of the third piezoelectric plate 231 on the ground electrode layer 11 side. Similarly, when the tensile force in the direction of the γ-axis is applied to the surface of the third piezoelectric plate 231, negative charge is collected in the vicinity of the surface of the third piezoelectric plate 231 on the internal electrode 232 side, and positive charge is collected in the vicinity of the surface of the third piezoelectric plate 231 on the ground electrode layer 11 side.

The fourth piezoelectric plate 233 is constituted by a piezoelectric substance having the fourth crystal axis CA4 oriented in the negative direction of the γ-axis. When the compressive force parallel or substantially parallel to the γ-axis is applied to the surface of the fourth piezoelectric plate 233, charge is induced into the fourth piezoelectric plate 233 by a piezoelectric effect. As a result, positive charge is collected in the vicinity of the surface of the fourth piezoelectric plate 233 on the internal electrode 232 side, and negative charge is collected in the vicinity of the surface of the fourth piezoelectric plate 233 on the ground electrode layer 11 side. Similarly, when the tensile force parallel or substantially parallel to the γ-axis is applied to the surface of the fourth piezoelectric plate 233, negative charge is collected in the vicinity of the surface of the fourth piezoelectric plate 233 on the internal electrode 232 side, and positive charge is collected in the vicinity of the surface of the fourth piezoelectric plate 233 on the ground electrode layer 11 side.

As constituent materials of the third piezoelectric plate 231 and the fourth piezoelectric plate 233, the same constituent materials as those of the first piezoelectric plate 121 and the second piezoelectric plate 123 can be used. In addition, the piezoelectric plate, such as the third piezoelectric plate 231 and the fourth piezoelectric plate 233, which generates charge by the external force (compressive/tensile force) perpendicular to the surface direction of the layer can be formed of X cut quartz crystal.

The internal electrode 232 has a function of outputting positive charge or negative charge, generated within the third piezoelectric plate 231 and the fourth piezoelectric plate 233, as the charge Qz. As described above, when the compressive force parallel or substantially parallel to the γ-axis is applied to the surface of the third piezoelectric plate 231 or the surface of the fourth piezoelectric plate 233, positive charge is collected in the vicinity of the internal electrode 232. As a result, positive charge Qz is output from the internal electrode 232. On the other hand, when the tensile force parallel or substantially parallel to the γ-axis is applied to the surface of the third piezoelectric plate 231 or the surface of the fourth piezoelectric plate 233, negative charge is collected in the vicinity of the internal electrode 232. As a result, negative charge Qz is output from the internal electrode 232.

The third piezoelectric substance 14 has a function of outputting the charge Qx in accordance with the external force (shearing force) applied (received) along the α-axis. The third piezoelectric substance 14 is configured to output positive charge in accordance with an external force applied along the positive direction of the α-axis, and to output negative charge in accordance with an external force applied along the negative direction of the α-axis.

The third piezoelectric substance 14 includes a fifth piezoelectric plate 241 having a fifth crystal axis CA5, a sixth piezoelectric plate 243, provided facing the fifth piezoelectric plate 241, which has a sixth crystal axis CA6, and an internal electrode 242, provided between the fifth piezoelectric plate 241 and the sixth piezoelectric plate 243, which outputs the charge Qx.

The fifth piezoelectric plate 241 is constituted by a piezoelectric substance having the fifth crystal axis CA5 oriented in the negative direction of the α-axis. When the external force along the positive direction of the α-axis is applied to the surface of the fifth piezoelectric plate 241, charge is induced into the fifth piezoelectric plate 241 by a piezoelectric effect. As a result, positive charge is collected in the vicinity of the surface of the fifth piezoelectric plate 241 on the internal electrode 242 side, and negative charge is collected in the vicinity of the surface of the fifth piezoelectric plate 241 on the ground electrode layer 11 side. Similarly, when the external force along the negative direction of the α-axis is applied to the surface of the fifth piezoelectric plate 241, negative charge is collected in the vicinity of the surface of the fifth piezoelectric plate 241 on the internal electrode 242 side, and positive charge is collected in the vicinity of the surface of the fifth piezoelectric plate 241 on the ground electrode layer 11 side.

The sixth piezoelectric plate 243 is constituted by a piezoelectric substance having the sixth crystal axis CA6 oriented in the positive direction of the α-axis. When the external force along the positive direction of the α-axis is applied to the surface of the sixth piezoelectric plate 243, charge is induced into the sixth piezoelectric plate 243 by a piezoelectric effect. As a result, positive charge is collected in the vicinity of the surface of the sixth piezoelectric plate 243 on the internal electrode 242 side, and negative charge is collected in the vicinity of the surface of the sixth piezoelectric plate 243 on the ground electrode layer 11 side. Similarly, when the external force along the negative direction of the α-axis is applied to the surface of the sixth piezoelectric plate 243, negative charge is collected in the vicinity of the surface of the sixth piezoelectric plate 243 on the internal electrode 242 side, and positive charge is collected in the vicinity of the surface of the sixth piezoelectric plate 243 on the ground electrode layer 11 side.

As constituent materials of the fifth piezoelectric plate 241 and the sixth piezoelectric plate 243, the same constituent materials as those of the first piezoelectric plate 121 and the second piezoelectric plate 123 can be used. In addition, the piezoelectric plate, such as the fifth piezoelectric plate 241 and the sixth piezoelectric plate 243, which generates charge by the external force (shearing force) applied along the surface direction of the layer can be formed of Y cut quartz crystal, similarly to the first piezoelectric plate 121 and the second piezoelectric plate 123.

The internal electrode 242 has a function of outputting positive charge or negative charge, generated within the fifth piezoelectric plate 241 and the sixth piezoelectric plate 243, as the charge Qx. As described above, when the external force along the positive direction of the α-axis is applied to the surface of the fifth piezoelectric plate 241 or the surface of the sixth piezoelectric plate 243, positive charge is collected in the vicinity of the internal electrode 242. As a result, positive charge Qx is output from the internal electrode 242. On the other hand, when the external force along the negative direction of the α-axis is applied to the surface of the fifth piezoelectric plate 241 or the surface of the sixth piezoelectric plate 243, negative charge is collected in the vicinity of the internal electrode 242. As a result, negative charge Qx is output from the internal electrode 242.

In this manner, the first piezoelectric substance 12, the second piezoelectric substance 13, and the third piezoelectric substance 14 are laminated so that the force detection directions of the respective piezoelectric substances are orthogonal to each other. Thereby, each of the piezoelectric substances 12, 13, and 14 can induce charge in accordance with force components orthogonal to each other. Therefore, the charge output element 10b can output three charges Qx, Qy, and Qz in accordance with the respective external forces applied along three axes (α (X)-axis, β (Y)-axis, and γ (Z)-axis).

In addition, the amount of charge generation per unit force of the first piezoelectric substance 12 and the third piezoelectric substance 14 which are formed of Y cut quartz crystal is, for example, 8 pC/N. The amount of charge generation per unit force of the second piezoelectric substance 13 formed of X cut quartz crystal is, for example, 4 pC/N. Therefore, generally, the sensitivity of the charge output element 10b to the external force (compressive/tensile force) parallel or substantially parallel to the γ-axis is lower than the sensitivity of the charge output element 10b to the external force (shearing force) parallel or substantially parallel to the α-axis or the β-axis. For this reason, generally, the charge Qz which is output from the second piezoelectric substance 13 is smaller than the charge Qy which is output from the first piezoelectric substance 12 and the charge Qx which is output from the third piezoelectric substance 14.

Conversion and Output Circuit

The conversion and output circuits 20a and 20c have the same configuration as that of the conversion and output circuit 20 of the first embodiment. The conversion and output circuit 20b has the same configuration as that of the conversion and output circuit 20 of the first embodiment, except for capacitance C3 of the capacitor 22. The conversion and output circuit 20a has a function of converting the charge Qx which is output from the charge output element 10b into the voltage Vx. The conversion and output circuit 20b has a function of converting the charge Qz which is output from the charge output element 10b into the voltage Vz. The conversion and output circuit 20c has a function of converting the charge Qy which is output from the charge output element 10b into the voltage Vy.

The same drive circuit may be connected to the switching element 23 of each of the conversion and output circuits 20a, 20b, and 20c, and different drive circuits may be connected thereto. All the on/off signals synchronized from the drive circuits are input to the respective switching elements 23. Thereby, the operations of the switching elements 23 of the respective conversion and output circuits 20a, 20b, and 20c are synchronized with each other. That is, the on/off timings of the switching elements 23 of the respective conversion and output circuits 20a, 20b, and 20c are consistent with each other.

As described above, generally, the charge Qz which is output from the second piezoelectric substance 13 is smaller than the charge Qy which is output from the first piezoelectric substance 12 and the charge Qx which is output from the third piezoelectric substance 14. Therefore, it is preferable that the capacitance C3 of the capacitor 22 of the conversion and output circuit 20b is smaller than the capacitance C1 of the capacitor 22 of the conversion and output circuits 20a and 20c. Thereby, the charge Qz can be converted into a voltage accurately.

In addition, the capacitance ratio C3/C1 of the capacitance C3 to the capacitance C1 is preferably 0.3 to 0.8, and is more preferably 0.45 to 0.6. When the capacitance ratio C3/C1 falls below the lower limit, the capacitor 22 may be saturated by the charge Qz. On the other hand, when the capacitance ratio C3/C1 exceeds the upper limit, sufficient sensitivity to the charge Qz may not be obtained.

In addition, since the switching elements 23 of the respective conversion and output circuits 20a, 20b, and 20c are the same semiconductor switching element, and are mounted under the same use environment, the leakage currents of the respective switching elements 23 are substantially equal to each other. Therefore, the output drifts D of the respective switching elements 23 are also substantially equal to each other.

The phrase "under the same use environment" as mentioned above includes, for example, a case where the respective switching elements 23 are mounted in the vicinity of each other, a case where the respective switching elements 23 are mounted in the same housing, a case where the respective switching elements 23 are mounted on the same semiconductor substrate, and the like.

Among these cases, it is preferable that the respective switching elements 23 are mounted on the same semiconductor substrate. The respective switching elements 23 are mounted on the same semiconductor substrate, thereby allowing the temperatures and humidities around the respective switching elements 23 to be made substantially equal to each other. In addition, when the respective switching elements 23 are mounted on the same semiconductor substrate, the respective switching elements 23 can be formed in the same process, which leads to the advantage of shortening a working process. In addition, since the respective switching elements 23 can be formed in the same process, it is possible to suppress a variation in the characteristics of the respective switching elements 23. Therefore, the leakage currents caused by the semiconductor structures of the respective switching elements 23 can be made equal to each other with a higher degree of accuracy.

Compensation Signal Output Circuit

The compensation signal output circuit 30 has the same configuration as that of the compensation signal output circuit 30 of the first embodiment. The compensation signal output circuit 30 has a function of outputting the compensation signal Voff for compensating for the voltage Vx which is output from the conversion and output circuit 20a, the voltage Vz which is output from the conversion and output circuit 20b, and the voltage Vy which is output from the conversion and output circuit 20c. As shown in the drawing, the compensation signal output circuit 30 may be provided independently of the conversion and output circuits 20a, 20b, and 20c.

In addition, the switching element 33 of the compensation signal output circuit 30 is mounted under the same use environment as that of the switching element 23 of each of the conversion and output circuits 20a, 20b, and 20c. Thereby, the leakage current of the switching element 33 operates simultaneously with the leakage current of each switching element 23. Therefore, the compensation signal output circuit 30 detects the leakage current of the switching element 33, thereby allowing the leakage current of each switching element 23 to be indirectly acquired. The compensation signal output circuit 30 outputs the leakage current of the acquired switching element 33 as the compensation signal Voff.

In this manner, the compensation signal output circuit 30 detects the leakage current of the switching element 33, thereby allowing the leakage current of the switching element 23 of each of the conversion and output circuits 20a, 20b, and 20c to be indirectly acquired. Therefore, the force detection device 1b of the embodiment is not required to provide three leakage current detection circuits for use in the respective conversion and output circuits 20a, 20b, and 20c. Therefore, it is possible to reduce the number of circuits required for the force detection device 1b, and to reduce the size and weight of the force detection device 1b.

In addition, it is preferable that the capacitance C2 of the capacitor 32 of the compensation signal output circuit 30 is smaller than the capacitance C3 of the capacitor 22 of the conversion and output circuit 20b. That is, it is preferable that the magnitude relation between the capacitances C1 and C3 of the capacitors 22 provided in the respective conversion and output circuits 20a, 20b, and 20c and the capacitance C2 of the capacitor 32 is C2<C3<C1. Thereby, the charges Qx, Qy, and Qz and the leakage current of the switching element 33 can be converted into voltages accurately.

External Force Detection Circuit

The external force detection circuit 40b has a function of detecting an applied external force on the basis of the voltage Vx which is output from the conversion and output circuit 20a, the voltage Vz which is output from the conversion and output circuit 20b, the voltage Vy which is output from the conversion and output circuit 20c, and the compensation signal Voff which is output from the compensation signal output circuit 30. The external force detection circuit 40b includes an AD converter 41b connected to the conversion and output circuits 20a, 20b, and 20c and the compensation signal output circuit 30, and an arithmetic operation circuit 42b connected to the AD converter 41b.

The AD converter 41b has a function of converting the voltages Vx, Vy, and Vz and the compensation signal Voff from analog signals into digital signals. The voltages Vx, Vy, and Vz and the compensation signal Voff which are digitally converted by the AD converter 41b are input to the arithmetic operation circuit 42b.

The arithmetic operation circuit 42b includes a gain correction portion (not shown) that gives gains to the voltages Vx, Vy, and Vz and the compensation signal Voff, which are digitally converted, to perform correction, and an arithmetic operation portion (not shown) that arithmetically operates and outputs signals Fx, Fy, and Fz on the basis of the voltages Vx, Vy, and Vz and the compensation signal Voff which are corrected by the gain correction portion.

The gain correction portion has a function of giving a gain G=a to the voltages Vx and Vy, giving a gain G=c to the voltage Vz, and giving a gain G=b to the compensation signal Voff, to thereby perform the correction of the voltages Vx, Vy, and Vz and the compensation signal Voff. It is preferable that the gain factor a and the gain factor b satisfy the relational expression of a=C1/C2×b. It is preferable that the gain factor c and the gain factor b satisfy the relational expression of c=C3/C2×b.

Herein, C1 is the capacitance of the capacitor 22 of the conversion and output circuits 20a and 20c, C2 is the capacitance of the capacitor 32 of the compensation signal output circuit 30, and C3 is the capacitance of the capacitor 22 of the conversion and output circuit 20b. Thereby, it is possible to correct the sensitivity difference between the voltages Vx and Vy and the compensation signal Voff which is caused by the difference between the capacitance C1 of the capacitor 22 of the conversion and output circuits 20a and 20c and the capacitance C2 of the capacitor 32. Similarly, it is possible to correct the sensitivity difference between the voltage Vz and the compensation signal Voff which is caused by the difference between the capacitance C3 of the capacitor 22 of the conversion and output circuit 20b and the capacitance C2 of the capacitor 32. Thereby, the output drift D (that is, a×D or c×D), included in the corrected voltages Vx, Vy, and Vz, which is caused by the leakage current and the corrected compensation signal Voff (that is, b×D) become substantially equal to each other. Meanwhile, a=1 means that the voltages Vx and Vy are not corrected. In addition, b=1 means that the compensation signal Voff is not corrected. Similarly, c=1 means that the voltage Vz is not corrected.

The arithmetic operation portion has a function of arithmetically operating and outputting the signals Fx, Fy, and Fz on the basis of the voltages Vx, Vy, and Vz corrected by the gain correction portion and the compensation signal Voff corrected by the gain correction portion. The signal Fx is arithmetically operated by taking the difference between the voltage Vx (that is, a×Vx) corrected by the gain correction portion and the compensation signal Voff (b×Voff) corrected by the gain correction portion. Therefore, the output signal Fx is as follows.

$$Fx = a \times Vx - b \times Voff$$
$$= a \times (Vxt + D) - b \times Voff$$
$$= a \times Vxt + a \times D - b \times Voff$$
$$\approx a \times Vxt$$

where Vxt is a voltage component (true value), included in the voltage Vx, which is proportional to the accumulated amount of the charge Qx.

Similarly, the signal Fy is arithmetically operated by taking the difference between the voltage Vy (that is, a×Vy) corrected by the gain correction portion and the compensation signal Voff (b×Voff) corrected by the gain correction portion. Therefore, the output signal Fy is as follows.

$$Fy = a \times Vy - b \times Voff$$
$$= a \times (Vyt + D) - b \times Voff$$
$$= a \times Vyt + a \times D - b \times Voff$$
$$\approx a \times Vyt$$

where, Vyt is a voltage component (true value), included in the voltage Vy, which is proportional to the accumulated amount of the charge Qy.

Similarly, the signal Fz is arithmetically operated by taking the difference between the voltage Vz (that is, c×Vz) corrected by the gain correction portion and the compensation signal Voff (b×Voff) corrected by the gain correction portion. Therefore, the output signal Fz is as follows.

$$Fz = c \times Vz - b \times Voff$$
$$= c \times (Vzt + D) - b \times Voff$$
$$= c \times Vzt + c \times D - b \times Voff$$
$$\approx c \times Vzt$$

where, Vzt is a voltage component (true value), included in the voltage Vz, which is proportional to the accumulated amount of the charge Qz.

As described above, since the output drift D (that is, a×D or c×D), included in the corrected voltages Vx, Vy, and Vz, which is caused by the leakage current and the corrected compensation signal Voff (b×Voff) are substantially equal to each other, it is possible to reduce (remove) the output drift D caused by the leakage current from the corrected voltages Vx, Vy, and Vz.

The arithmetic operation circuit 42b has such a configuration, and thus can output the signals Fx, Fy, and Fz proportional to the accumulated amounts of the charges Qx, Qy, and Qz which are output from the charge output element 10b. Since the signals Fx, Fy, and Fz correspond to three-axis forces (shearing force and compressive/tensile force) applied to the charge output element 10b, the force detection device 1b can detect the three-axis forces applied to the charge output element 10a.

In this manner, the force detection device 1b of the embodiment includes the compensation signal output circuit 30 and the external force detection circuit 40b, and thus can reduce the output drift D caused by the leakage current of the switching element 23 of the conversion and output circuits 20a, 20b, and 20c. As a result, it is possible to improve the detection accuracy and detection resolution of the force detection device 1b. In addition, a method of reducing the above-mentioned output drift D is effective even when the measurement time gets longer, and thus it is possible to lengthen the measurement time of the force detection device 1b.

Third Embodiment

Next, a six-axis force detection device (force detection device) which is a third embodiment of the invention will be described with reference to FIG. 6. Hereinafter, the third embodiment will be described with an emphasis on the differences with the above-mentioned first and second embodiments, and the description of the same particulars will be omitted.

Figure 6:
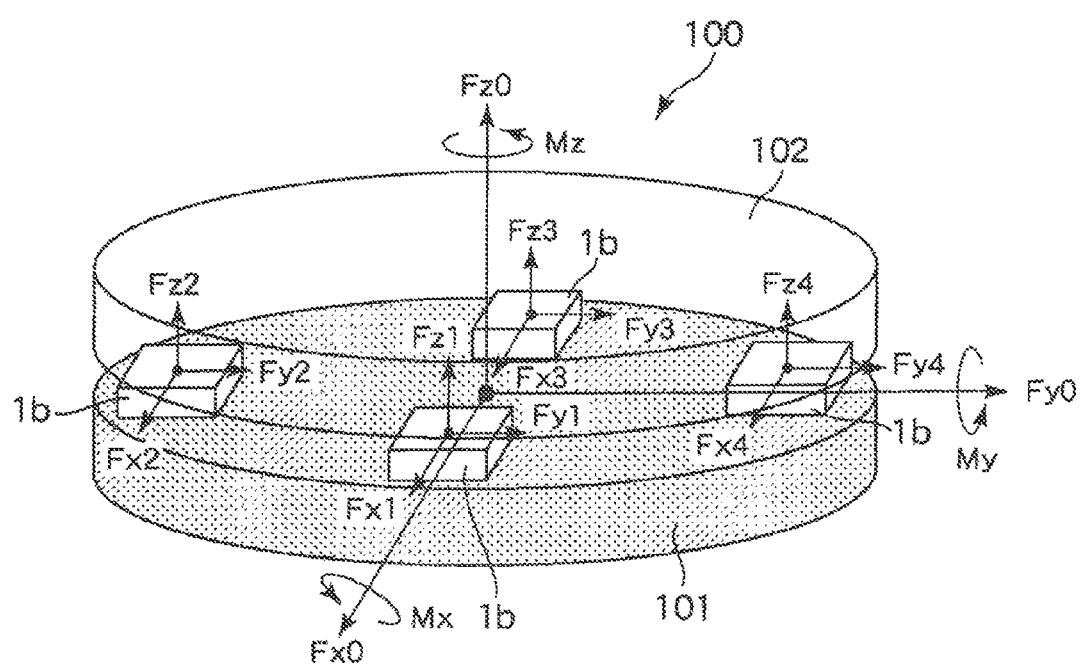
FIG. 6 is a perspective view schematically illustrating a third embodiment of the force detection device according to the invention.

FIG. 6 is a perspective view schematically illustrating the third embodiment of the force detection device according to the invention. A six-axis force detection device (force detection device) 100 of FIG. 6 has a function of detecting six-axis forces (translational force components in the directions of the x, y, and z axes and rotational force components around the x, y, and z axes). The six-axis force detection device 100 includes a first substrate 101, a second substrate 102 facing the first substrate 101, four force detection devices 1b interposed (provided) between the first substrate 101 and the second substrate 102, and an arithmetic operation portion (not shown) connected to the four force detection devices 1b. Meanwhile, in FIG. 6, the second substrate 102 is shown in perspective for convenience of description.

As described above, the force detection device 1b has a function of detecting external forces applied along three axes (α (X)-axis, β (Y)-axis, and γ (Z)-axis) orthogonal to each other. In addition, the force detection devices 1b are interposed (provided) between the first substrate 101 and the second substrate 102 with all facing the same direction. As shown in the drawing, the force detection devices 1b are preferably disposed at equal angular intervals along the circumferential direction of the first substrate 101 or the second substrate 102, and are more preferably disposed at equal intervals concentrically about the central point of the first substrate 101 or the second substrate 102. In this manner, the force detection devices 1b are disposed, and thus it is possible to detect the external forces in an unbiased manner.

When an external force by which the relative positions of the first substrate 101 and the second substrate 102 are mutually shifted in an Fx0 direction is applied, the force detection devices 1b output signals Fx1, Fx2, Fx3, and Fx4, respectively. Similarly, when an external force by which the relative positions of the first substrate 101 and the second substrate 102 are mutually shifted in an Fy0 direction is applied, the force detection devices 1b output signals Fy1, Fy2, Fy3, and Fy4, respectively. In addition, when an external force by which the relative positions of the first substrate 101 and the second substrate 102 are mutually shifted in an Fz0 direction is applied, the force detection devices 1b output signals Fz1, Fz2, Fz3, and Fz4, respectively.

In addition, in the first substrate 101 and the second substrate 102, the relative displacement of rotation about the x-axis, the relative displacement of rotation about the y-axis, and the relative displacement of rotation about the z-axis can be made with each other, and an external force associated with each rotation can be transmitted to the force detection device 1b.

The arithmetic operation portion has a function of arithmetically operating a translational force component Fx0 in the x-axis direction, a translational force component Fy0 in the y-axis direction, a translational force component Fz0 in the z-axis direction, a rotational force component Mx about the x-axis, a rotational force component My about the y-axis, and a rotational force component Mz about the z-axis, on the basis of a signal which is output from each of the force detection devices 1b. The force components can be obtained by the following expressions, respectively.

$$Fx0=Fx1+Fx2+Fx3+Fx4$$

$$Fy0=Fy1+Fy2+Fy3+Fy4$$

$$Fz0=Fz1+Fz2+Fz3+Fz4$$

$$Mx=b\times(Fz4-Fz2)$$

$$My=a\times(Fz3-Fz1)$$

$$Mz=b\times(Fx2-Fx4)+a\times(Fy1-Fy3)$$

Herein, a and b are constants.

In this manner, the six-axis force detection device 100 includes the first substrate 101, the second substrate 102, a plurality of force detection devices 1b and the arithmetic operation portion, and thus can detect six-axis forces.

Meanwhile, in the shown configuration, the number of force detection devices 1b is four, but the invention is not limited thereto. When the six-axis force detection device 100 has at least three force detection devices 1b, six-axis forces can be detected. When the number of force detection devices 1b is three, the number of force detection devices 1b is small, and thus it is possible to reduce the weight of the six-axis force detection device 100. When the number of force detection devices 1b is four as shown in the drawing, six-axis forces can be obtained by a very simple arithmetic operation as described above, and thus it is possible to simplify the arithmetic operation portion. In addition, when the number of force detection devices 1b is six, it is possible to detect six-axis forces with a higher degree of accuracy.

Fourth Embodiment

Figure 7A:
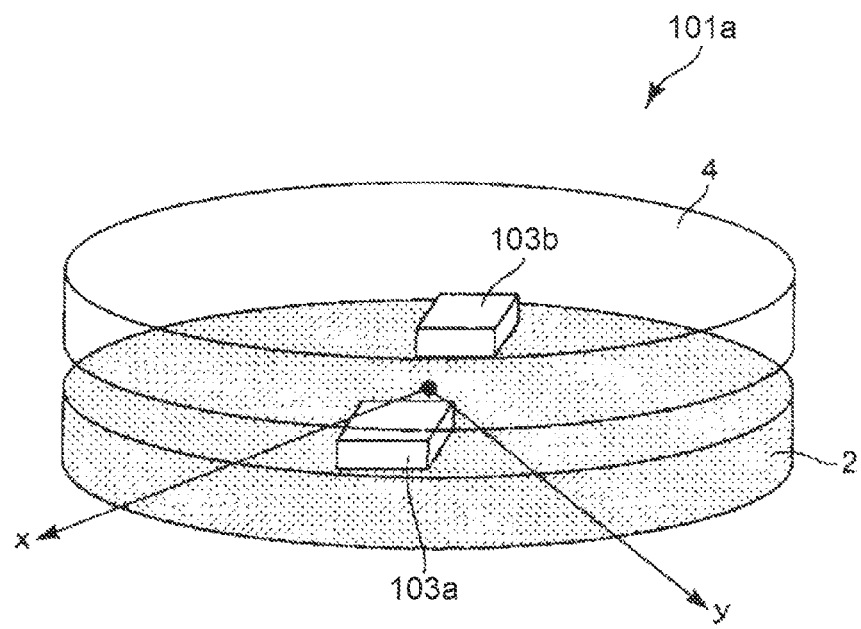
FIGS. 7A and 7B are a perspective view and a plan view, respectively, schematically illustrating a fourth embodiment of the force detection device according to the invention.
Figure 7B:
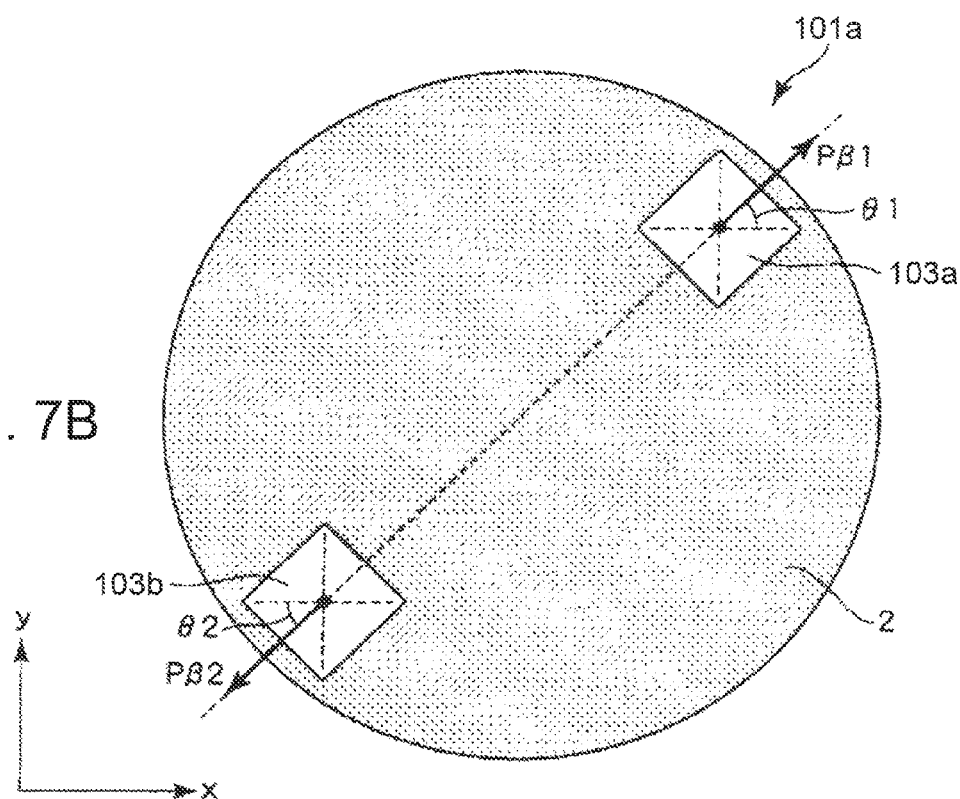
Figure 8:
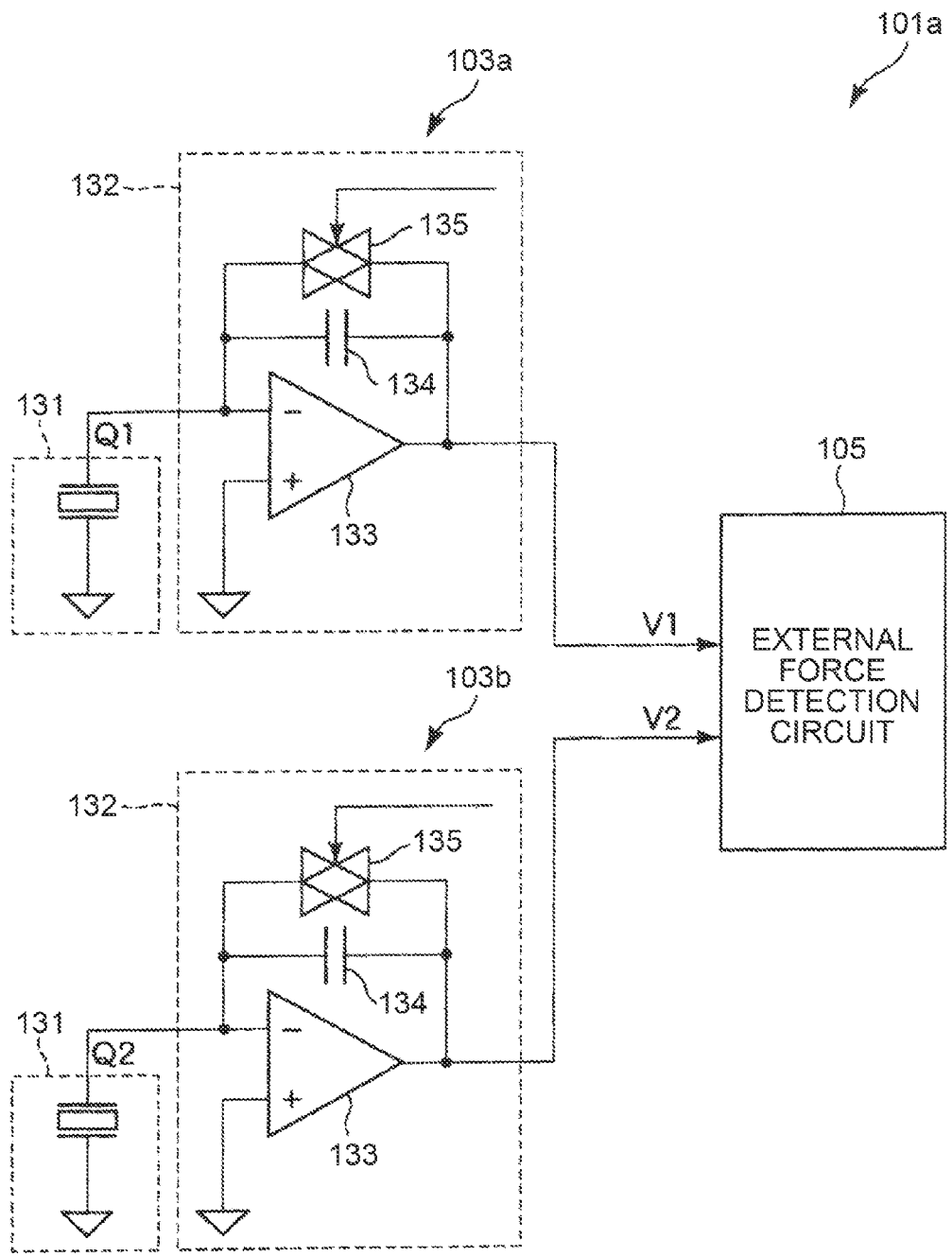
FIG. 8 is a circuit diagram schematically illustrating the force detection device shown in FIGS. 7A and 7B.
Figure 9:
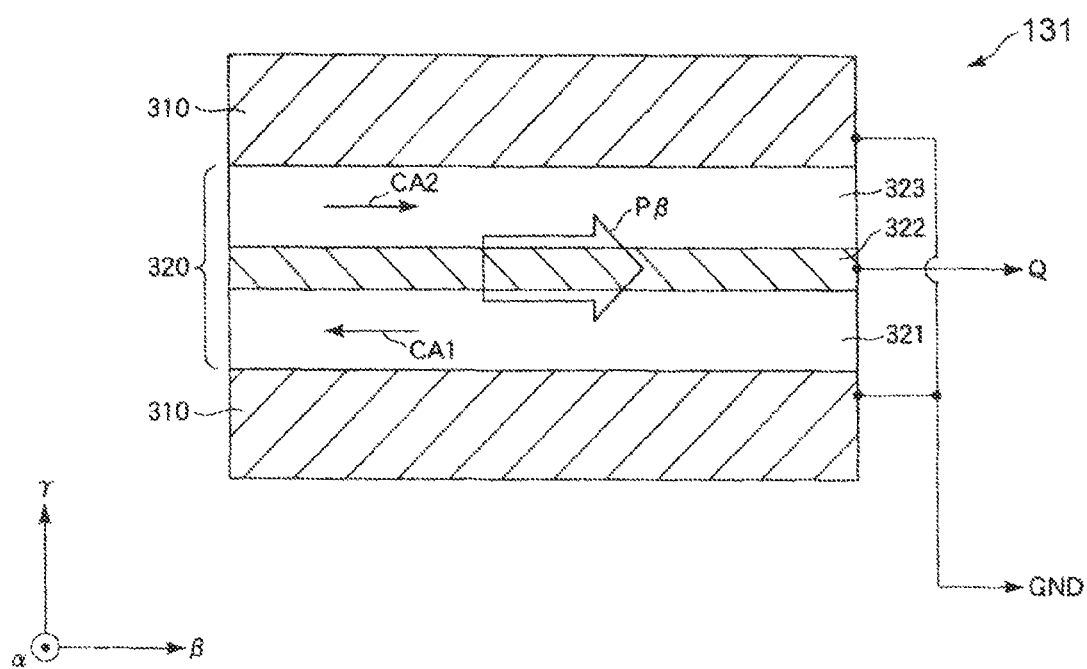
FIG. 9 is a cross-sectional view schematically illustrating a charge output element of the force detection device shown in FIGS. 7A and 7B.

FIG. 7A is a perspective view schematically illustrating a fourth embodiment of the force detection device according to the invention. FIG. 7B is a plan view schematically illustrating the fourth embodiment of the force detection device according to the invention. Meanwhile, in FIG. 7A, some of the components are shown in perspective for the purpose of description. In FIG. 7B, some of the components are omitted for the purpose of description. FIG. 8 is a circuit diagram schematically illustrating the force detection device shown in FIGS. 7A and 7B. FIG. 9 is a cross-sectional view schematically illustrating a charge output element of the force detection device shown in FIGS. 7A and 7B.

A force detection device 101a shown in FIGS. 7A and 7B has a function of detecting shearing forces (external forces applied along the x-axis and the y-axis in FIGS. 7A and 7B). The force detection device 101a includes a base plate 2, a cover plate 4 provided separately so as to face the base plate 2, force detection elements 103a and 103b, interposed (provided) between the base plate 2 and the cover plate 4, which output voltages in accordance with external forces, and an external force detection circuit 105 (not shown in FIG. 7A or 7B; see FIG. 8) that detects the external forces on the basis of the voltage which is output from each of the force detection elements 103a and 103b. Here, the force detection element 103a is equivalent to a first element, and the force detection element 103b is equivalent to a second element.

Force Detection Element

The force detection elements 103a and 103b shown in FIGS. 7A and 7B have a function of outputting a voltage V in accordance with the applied shearing forces (external forces applied along the x-axis and the y-axis in FIGS. 7A and 7B).

As shown in FIG. 8, each of the force detection elements 103a and 103b includes a charge output element 131 that outputs charge Q in accordance with the applied shearing force and a conversion and output circuit 132 that converts the charge Q which is output from the charge output element 131 into the voltage V. Specifically, the force detection element 103a includes the charge output element 131 that outputs charge Q1 and the conversion and output circuit 132 that converts the charge Q1 into a voltage V1 and outputs the resultant. In addition, the force detection element 103b includes the charge output element 131 that outputs charge Q2 and the conversion and output circuit 132 that converts the charge Q2 into a voltage V2 and outputs the resultant.

Charge Output Element

The charge output element 131 shown in FIG. 9 has a function of outputting the charge Q in accordance with an external force (shearing force) parallel or substantially parallel to the β-axis in FIG. 9. The charge output element 131 includes two ground electrode layers 310 and a β-axis piezoelectric substance 320 provided between the two ground electrode layers 310. Meanwhile, in FIG. 9, the lamination direction of the ground electrode layers 310 and the β-axis piezoelectric substance 320 is set to a γ-axis direction, and the directions which are orthogonal to the γ-axis direction and are orthogonal to each other are set to an α-axis direction and a β-axis direction, respectively.

In the shown configuration, both the ground electrode layer 310 and the β-axis piezoelectric substance 320 have the same width (length in a horizontal direction in the drawing), but the invention is not limited thereto. For example, the width of the ground electrode layer 310 may be greater than the width of the β-axis piezoelectric substance 320, or vice versa.

The ground electrode layer 310 is an electrode grounded to a ground (reference potential point) GND. Materials constituting the ground electrode layer 310, though not particularly limited are preferably, for example, gold, chromium, titanium, aluminum, copper, iron or an alloy containing these materials.

The β-axis piezoelectric substance 320 has a function of outputting the charge Q in accordance with the external force (shearing force) parallel or substantially parallel to the β-axis. The β-axis piezoelectric substance 320 is configured to output positive charge in accordance with an external force applied along the positive direction of the β-axis, and to output negative charge in accordance with an external force applied along the negative direction of the β-axis. That is, the β-axis piezoelectric substance 320 has an electric axis Pβ facing the positive direction of the β-axis.

The β-axis piezoelectric substance 320 includes a first piezoelectric plate 321 having a first crystal axis CA1, a second piezoelectric plate 323, provided facing the first piezoelectric plate 321, which has a second crystal axis CA2, and an internal electrode 322, provided between the first piezoelectric plate 321 and the second piezoelectric plate 323, which outputs the charge Q. In addition, the lamination order of respective layers constituting the β-axis piezoelectric substance 320 is the first piezoelectric plate 321, the internal electrode 322, and the second piezoelectric plate 323 in this order from the lower side in FIG. 9.

The first piezoelectric plate 321 is constituted by a piezoelectric substance having the first crystal axis CA1 oriented in the negative direction of the β-axis. When the external force along the positive direction of the β-axis is applied to the surface of the first piezoelectric plate 321, charge is induced into the first piezoelectric plate 321 by a piezoelectric effect. As a result, positive charge is collected in the vicinity of the surface of the first piezoelectric plate 321 on the internal electrode 322 side, and negative charge is collected in the vicinity of the surface of the first piezoelectric plate 321 on the ground electrode layer 310 side. Similarly, when the external force along the negative direction of the β-axis is applied to the surface of the first piezoelectric plate 321, negative charge is collected in the vicinity of the surface of the first piezoelectric plate 321 on the internal electrode 322 side, and positive charge is collected in the vicinity of the surface of the first piezoelectric plate 321 on the ground electrode layer 310 side.

The second piezoelectric plate 323 is constituted by a piezoelectric substance having the second crystal axis CA2 oriented in the positive direction of the β-axis. When the external force along the positive direction of the β-axis is applied to the surface of the second piezoelectric plate 323, charge is induced into the second piezoelectric plate 323 by a piezoelectric effect. As a result, positive charge is collected in the vicinity of the surface of the second piezoelectric plate 323 on the internal electrode 322 side, and negative charge is collected in the vicinity of the surface of the second piezoelectric plate 323 on the ground electrode layer 310 side. Similarly, when the external force along the negative direction of the β-axis is applied to the surface of the second piezoelectric plate 323, negative charge is collected in the vicinity of the surface of the second piezoelectric plate 323 on the internal electrode 322 side, and positive charge is collected in the vicinity of the surface of the second piezoelectric plate 323 on the ground electrode layer 310 side.

In this manner, the direction of the first crystal axis CA1 of the first piezoelectric plate 321 is opposite to the direction of the second crystal axis CA2 of the second piezoelectric plate 323. Thereby, it is possible to increase the positive charge or the negative charge collected in the vicinity of the internal electrode 322, as compared with a case where the β-axis piezoelectric substance 320 is constituted by only any one of the first piezoelectric plate 321 and the second piezoelectric plate 323, and the internal electrode 322. As a result, it is possible to increase the charge Q which is output from the internal electrode 322.

Meanwhile, constituent materials of the first piezoelectric plate 321 and the second piezoelectric plate 323 include quartz crystal, topaz, barium titanate, lead titanate, lead zirconate titanate (PZT: Pb(Zr, Ti)O$_3$), lithium niobate, lithium tantalite, and the like. Among these materials, particularly, quartz crystal is preferable. This is because a piezoelectric plate formed of quartz crystal has characteristics excellent in a wide dynamic range, high rigidity, high natural frequency, and high load bearing capacity. In addition, a piezoelectric plate, such as the first piezoelectric plate 321 and the second piezoelectric plate 323, which generates charge by an external force (shearing force) applied along the surface direction of the layer can be formed of Y cut quartz crystal.

The internal electrode 322 has a function of outputting positive charge or negative charge, generated within the first piezoelectric plate 321 and the second piezoelectric plate 323, as the charge Q. As described above, when the external force along the positive direction of the β-axis is applied to the surface of the first piezoelectric plate 321 or the surface of the second piezoelectric plate 323, positive charge is collected in the vicinity of the internal electrode 322. As a result, positive charge Q is output from the internal electrode 322. On the other hand, when the external force along the negative direction of the β-axis is applied to the surface of the first piezoelectric plate 321 or the surface of the second piezoelectric plate 323, negative charge is collected in the vicinity of the internal electrode 322. As a result, negative charge Q is output from the internal electrode 322.

In this manner, the charge output element 131 includes the ground electrode layer 310 and the β-axis piezoelectric substance 320 mentioned above, and thus can output the charge Q in accordance with the external force (shearing force) parallel or substantially parallel to the β-axis in FIG. 9.

Meanwhile, an example has been described in which the charge output element 131 has a function of outputting the charge Q in accordance with the external force (shearing force) parallel or substantially parallel to the β-axis, but the invention is not limited thereto. By using the first piezoelectric plate 321 having the orientation direction of the first crystal axis CA1 being the α-axis direction different from the β-axis direction and the second piezoelectric plate 323 having the orientation direction of the second crystal axis CA2 being the α-axis direction different from the β-axis direction, it is possible to form the charge output element 131 that outputs the charge Q in accordance with the external force (shearing force) parallel or substantially parallel to the α-axis. Such a case is also within the scope of the invention.

Conversion and Output Circuit

The conversion and output circuit 132 has a function of converting the charge Q (Q1, Q2) which is output from the charge output element 131 into the voltage V (V1, V2). The conversion and output circuit 132 includes an operational amplifier 133, a capacitor 134, and a switching element 135. A first input terminal (negative input) of the operational amplifier 133 is connected to the internal electrode 322 of the charge output element 131, and a second input terminal (positive input) of the operational amplifier 133 is grounded to a ground (reference potential point). In addition, an output terminal of the operational amplifier 133 is connected to the external force detection circuit 105. The capacitor 134 is connected between the first input terminal and the output terminal of the operational amplifier 133. The switching element 135 is connected between the first input terminal and the output terminal of the operational amplifier 133, and is connected in parallel with the capacitor 134. In addition, the switching element 135 is connected to a drive circuit (not shown), and executes a switching operation in accordance with an on/off signal from the drive circuit.

When the switching element 135 is turned off, the charge Q which is output from the charge output element 131 is accumulated in the capacitor 134 having the capacitance C1, and is output to the external force detection circuit 105 as the voltage V. Next, when the switching element 135 is turned on, both terminals of the capacitor 134 are short-circuited therebetween. As a result, the charge Q accumulated in the capacitor 134 is discharged to be held at 0 coulombs, and the voltage V which is output to the external force detection circuit 105 is held at 0 volts. The turn-on of the switching element 135 refers to the resetting of the conversion and output circuit 132.

The switching element 135 is a semiconductor switching element such as a MOSFET (Metal Oxide Semiconductor Field Effect Transistor). A semiconductor switching element is smaller in size and lighter in weight than a mechanical switch, and thus has an advantage in reducing the size and weight of the force detection device 101a. Hereinafter, as a representative example, a case where a MOSFET is used as the switching element 135 will be described.

The switching element 135 has a drain electrode, a source electrode, and a gate electrode. One of the drain electrode and the source electrode of the switching element 135 is connected to the first input terminal of the operational amplifier 133, and the other of the drain electrode and the source electrode is connected to the output terminal of the operational amplifier 133. In addition, a gate electrode of the switching element 135 is connected to a drive circuit (not shown).

The voltage V which is output from the ideal conversion and output circuit 132 is proportional to the accumulated amount of the charge Q which is output from the charge output element 131. However, in the actual conversion and output circuit 132, a leakage current flowing from the switching element 135 into the capacitor 134 is generated. Such a leakage current acts as an output drift D included in the voltage V. Therefore, when a voltage component (true value) proportional to the accumulated amount of the charge Q is set to Vt, the output voltage V satisfies the relation of V=Vt+D.

Since the output drift D is equivalent to an error on a measurement result, there is a problem in that the detection accuracy and detection resolution of the force detection elements 103a and 103b deteriorate due to the leakage current (output drift D). In addition, since the leakage current is accumulated in proportion to the measurement (drive) time, there is a problem in that the measurement time of the force detection device 101a cannot be lengthened.

Such a leakage current is caused by semiconductor structures such as the lack of insulation properties of a gate insulating film, the refinement of a process rule, and the variation of impurity concentration in a semiconductor, and use environments such as temperature and humidity. The leakage current caused by the semiconductor structure serves as an eigenvalue for each switching element, and thus can be compensated for relatively easily by measuring the leakage current caused by the semiconductor structure in advance. However, since the leakage current caused by the use environment fluctuates depending on the use environment (condition), it is not likely that the leakage current will be compensated for. The force detection device 101a of the embodiment can reduce the influence (output drift D) of the leakage current using the external force detection circuit 105 that detects an external force, on the basis of the voltages V1 and V2 which are output from the force detection elements 103a and 103b constituting an element pair and the force detection elements 103a and 103b, respectively.

Next, the positional relation between the force detection elements 103a and 103b constituting an element pair will be described in detail with reference to FIGS. 7A and 7B. Meanwhile, in FIG. 7B, the cover plate 4 is omitted for the purpose of description. In addition, in FIG. 7B, a horizontal direction is set to an x-axis direction, and a direction orthogonal to the x-axis direction, that is, a vertical direction is set to a y-axis direction.

The force detection element 103a has an electric axis Pβ1 along the above-mentioned β-axis, and outputs the voltage V1 in accordance with the external force (shearing force) applied along the β-axis. Similarly, the force detection element 103b has a electric axis Pβ2 along the above-mentioned β-axis, and outputs the voltage V2 in accordance with the external force (shearing force) applied along the β-axis.

The force detection elements 103a and 103b are provided (interposed) between the base plate 2 and the cover plate 4. The electric axis Pβ1 of the force detection element 103a has an angle θ1. Similarly, the electric axis Pβ2 of the force detection element 103b has an angle θ2. Meanwhile, the angles θ1 and θ2 are angles from the x-axis of a reference coordinate system (x-axis and y-axis) of FIG. 7B.

As shown in FIG. 7B, the force detection elements 103a and 103b are disposed so that the direction of the electric axis Pβ1 of the force detection element 103a and the direction of the electric axis Pβ2 of the force detection element 103b are different from each other, and are opposite to each other in the embodiment. The phrase "opposite to each other" as used herein is not limited to a case where the direction of the electric axis Pβ1 and the direction of the electric axis Pβ2 face each other as shown in FIG. 7B, that is, a case where the angles θ1 and θ2 satisfy the relation of θ1=θ2. When at least the electric axis Pβ1 and the electric axis Pβ2 are decomposed into a vector component in the x-axis direction and a vector component in the y-axis direction, respectively, which are orthogonal to each other, the vector component of the electric axis Pβ1 in the x-axis direction and the vector component of the electric axis Pβ2 in the x-axis direction may be opposite to each other in direction, or the vector component of the electric axis Pβ1 in the y-axis direction and the vector component of the electric axis Pβ2 in the y-axis direction may be opposite to each other in direction.

In addition, it is preferable that the force detection elements 103a and 103b are disposed so that the vector component of the electric axis Pβ1 in the x-axis direction and the vector component of the electric axis Pβ2 in the x-axis direction are opposite to each other in direction, and the vector component of the electric axis Pβ1 in the y-axis direction and the vector component of the electric axis Pβ2 in the y-axis direction are opposite to each other in direction, that is, the relation of $|θ1−θ2|<π/2$ is satisfied. Thereby, it is possible to detect shearing forces Fx and Fy described later. In the following description, typically, a case will be described in which the force detection elements 103a and 103b are disposed so as to satisfy the relation of $|θ1−θ2|<π/2$.

In addition, it is more preferable that the force detection elements 103a and 103b are disposed so that the direction of the electric axis Pβ1 and the direction of the electric axis Pβ2 face each other, that is, the relation of θ1=θ2 is satisfied. Thereby, the external force detection circuit 105 described later can detect the shearing forces Fx and Fy while further reducing the output drift D.

In addition, when the force detection elements are disposed so that the direction of the electric axis Pβ1 of the force detection element 103a and the direction of the electric axis Pβ2 of the force detection element 103b are opposite to each other, the arrangement of the force detection elements 103a and 103b is not particularly limited. However, as shown in FIG. 7B, it is preferable that the force detection element 103a and the force detection element 103b are disposed on the same axis. Thereby, the shearing forces (external forces applied along the x-axis and the y-axis in the drawing) applied to the base plate 2 or the cover plate 4 can be detected in an unbiased manner.

In addition, the electric axis Pβ1 of the force detection element 103a and the electric axis Pβ2 of the force detection element 103b in FIG. 7B face the outside (centrifugal direction) of the base plate 2, but the invention is not limited thereto. That is, when the force detection elements are disposed so that the direction of the electric axis Pβ1 of the force detection element 103a and the direction of the electric axis Pβ2 of the force detection element 103b are opposite to each other, the electric axis Pβ1 of the force detection element 103a and the electric axis Pβ2 of the force detection element 103b may face the central direction (centripetal direction) of the base plate 2.

When a voltage component (true value) proportional to the accumulated amount of charge Q1 which is output from the charge output element 131 of the force detection element 103a is set to Vt1, and a voltage component (true value) proportional to the accumulated amount of charge Q2 which is output from the charge output element 131 of the force detection element 103b is set to Vt2, the voltage V1 which is output from the force detection element 103a and the voltage V2 which is output from the force detection element 103b are as follows.

$$V1 = Vt1 + D$$

$$V2 = Vt2 + D$$

Meanwhile, the switching element 135 of the force detection element 103a and the switching element 135 of the force detection element 103b are the same semiconductor switching element, and the leakage currents thereof are substantially equal to each other. Therefore, the output drift D included in the voltage V1 and the output drift D included in the voltage V2 are substantially equal to each other. The phrase "substantially equal" as used herein refers to the fact that when a difference between two values to be compared is taken, the difference is negligibly small as compared with an original value.

In addition, since the force detection elements 103a and 103b are disposed so that the direction of the electric axis Pβ1 of the force detection element 103a and the direction of the electric axis Pβ2 of the force detection element 103b are opposite to each other, the sign of the voltage component Vt1 included in the voltage V1 and the sign of the voltage component Vt2 included in the voltage V2 are not consistent with each other. For example, when the sign of the voltage component Vt1 is positive, the sign of the voltage component Vt2 becomes negative. Similarly, when the sign of the voltage component Vt1 is negative, the sign of the voltage component Vt2 becomes positive. Therefore, when the difference between the voltage V1 which is output from the force detection element 103a and the voltage V2 which is output from the force detection element 103b is taken, the absolute value of the difference between the voltage component Vt1 and the voltage component Vt2 does not decrease.

On the other hand, since the output drift D included in the voltage V1 and the output drift D included in the voltage V2 are independent of the directions of the electric axes Pβ1 and Pβ2, the sign of the output drift D included in the voltage V1 and the sign of the output drift D included in the voltage V2 are consistent with each other. Therefore, when the difference between the voltage V1 which is output from the force detection element 103a and the voltage V2 which is output from the force detection element 103b is taken, the absolute value of the difference between the output drift D included in the voltage V1 and the output drift D included in the voltage V2 decreases.

External Force Detection Circuit

The external force detection circuit 105 has a function of detecting the shearing forces (external forces applied along the x-axis and the y-axis in the drawing) applied to the force detection device 101a by taking the difference between the voltage V1 which is output from the force detection element 103a and the voltage V2 which is output from the force detection element 103b.

The external force detection circuit 105 can detect the shearing forces Fx and Fy applied to the force detection device 101a by taking the difference between the voltages V1 and V2 as follows.

$$Fx = V1\cos(\theta1) - V2\cos(\theta2)$$
$$= Vt1\cos(\theta1) - Vt2\cos(\theta2) + D\{\cos(\theta1) - \cos(\theta2)\}$$

$$Fy = V1\sin(\theta1) - V2\sin(\theta2)$$
$$= Vt1\sin(\theta1) - Vt2\sin(\theta2) + D\{\sin(\theta1) - \sin(\theta2)\}$$

In this manner, when the difference between the voltage V1 which is output from the force detection element 103a and the voltage V2 which is output from the force detection element 103b is taken, the absolute value of the difference between the voltage component Vt1 and the voltage component Vt2 does not decrease, but the absolute value of the output drift D decreases. Therefore, it is possible to reduce the output drift D. As a result, a detection error caused by the leakage current (output drift D) becomes relatively small, and thus it is possible to improve the detection accuracy and detection resolution of the force detection device 101a. In addition, a method of reducing the above-mentioned output drift D is effective even when the measurement time gets longer, and thus it is possible to lengthen the measurement time of the force detection device 101a.

Further, when the angles θ1 and θ2 satisfy the relation of θ1=θ2, that is, when the force detection elements 103a and 103b are disposed so that the direction of the electric axis Pβ1 and the direction of the electric axis Pβ2 face each other, the calculation expressions of Fx and Fy mentioned above are simplified as follows.

$$Fx = (Vt1 - Vt2)\cos(\theta1)$$

$$Fy = (Vt1 - Vt2)\sin(\theta1)$$

In this case, it is possible to remove (further reduce) the output drift D. As a result, it is possible to further improve the detection accuracy and detection resolution of the force detection device 101a. In addition, it is possible to further lengthen the measurement time of the force detection device 101a.

In this manner, the force detection device 101a of the embodiment includes force detection elements 103a and 103b which are disposed so that the direction of the electric axis Pβ1 of the force detection element 103a and the direction of the electric axis Pβ2 of the force detection element 103b are opposite to each other, and the external force detection circuit 105 that detects the shearing force applied to the force detection device 101a by taking the difference between the voltage V1 which is output from the force detection element 103a and the voltage V2 which is output from the force detection element 103b, and thus can reduce the output drift D caused by the leakage current of the switching element 135 of the conversion and output circuit 132. As a result, it is possible to improve the detection accuracy and detection resolution of the force detection device 101a. In addition, the method of reducing the above-mentioned output drift D is effective even when the measurement time gets longer, and thus it is possible to lengthen the measurement time of the force detection device 101a. Further, since a circuit, such as a reverse bias circuit, for reducing the output drift D is not required in the force detection device 101a of the embodiment, it is possible to reduce the size of the force detection device 101a.

Meanwhile, the force detection device 101a of the embodiment includes a pair of force detection elements 103a and 103b, but the invention is not limited thereto. The force detection device 101a may include multiple pairs of force detection elements 103a and 103b, and such a case is also within the scope of the invention.

Fifth Embodiment

Next, a fifth embodiment of the invention will be described with reference to FIGS. 10A and 10B, FIG. 11, and FIGS. 12A and 12B. Hereinafter, the fifth embodiment will be described with an emphasis on the difference with the above-mentioned fourth embodiment, and the description of the same particulars will be omitted.

Figure 10A:
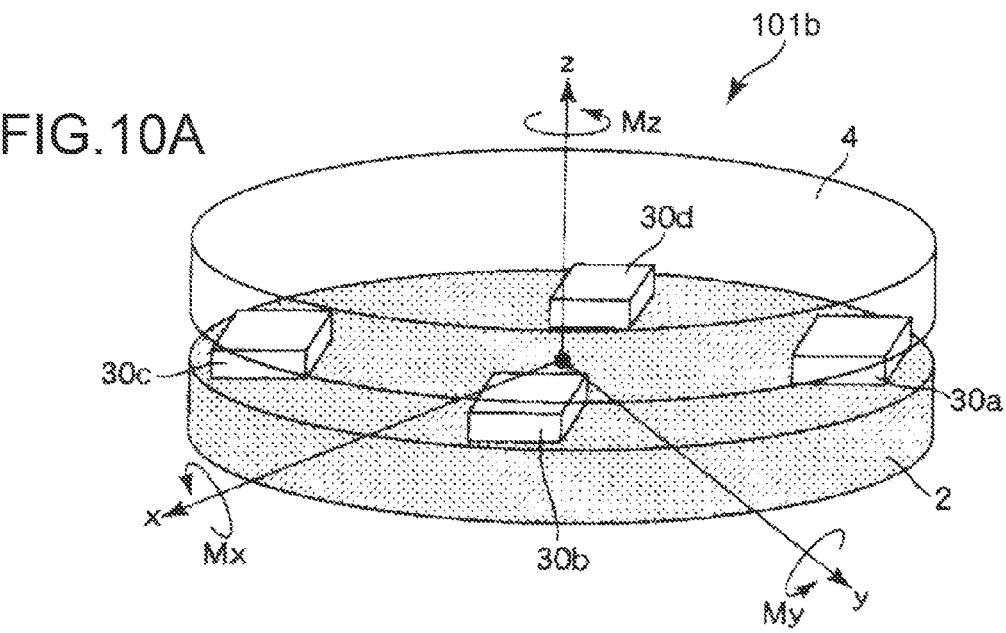
FIGS. 10A and 10B are a perspective view and a plan view, respectively, schematically illustrating a fifth embodiment of the force detection device according to the invention.
Figure 10B:
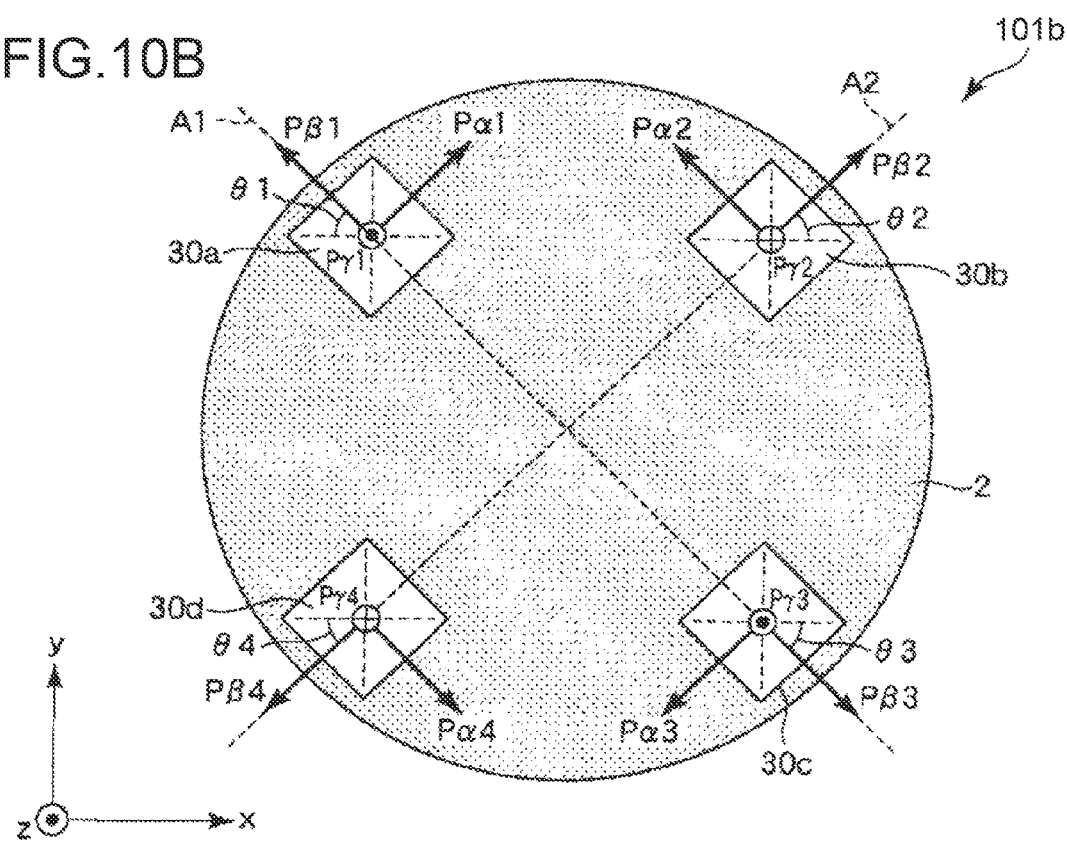
Figure 11:
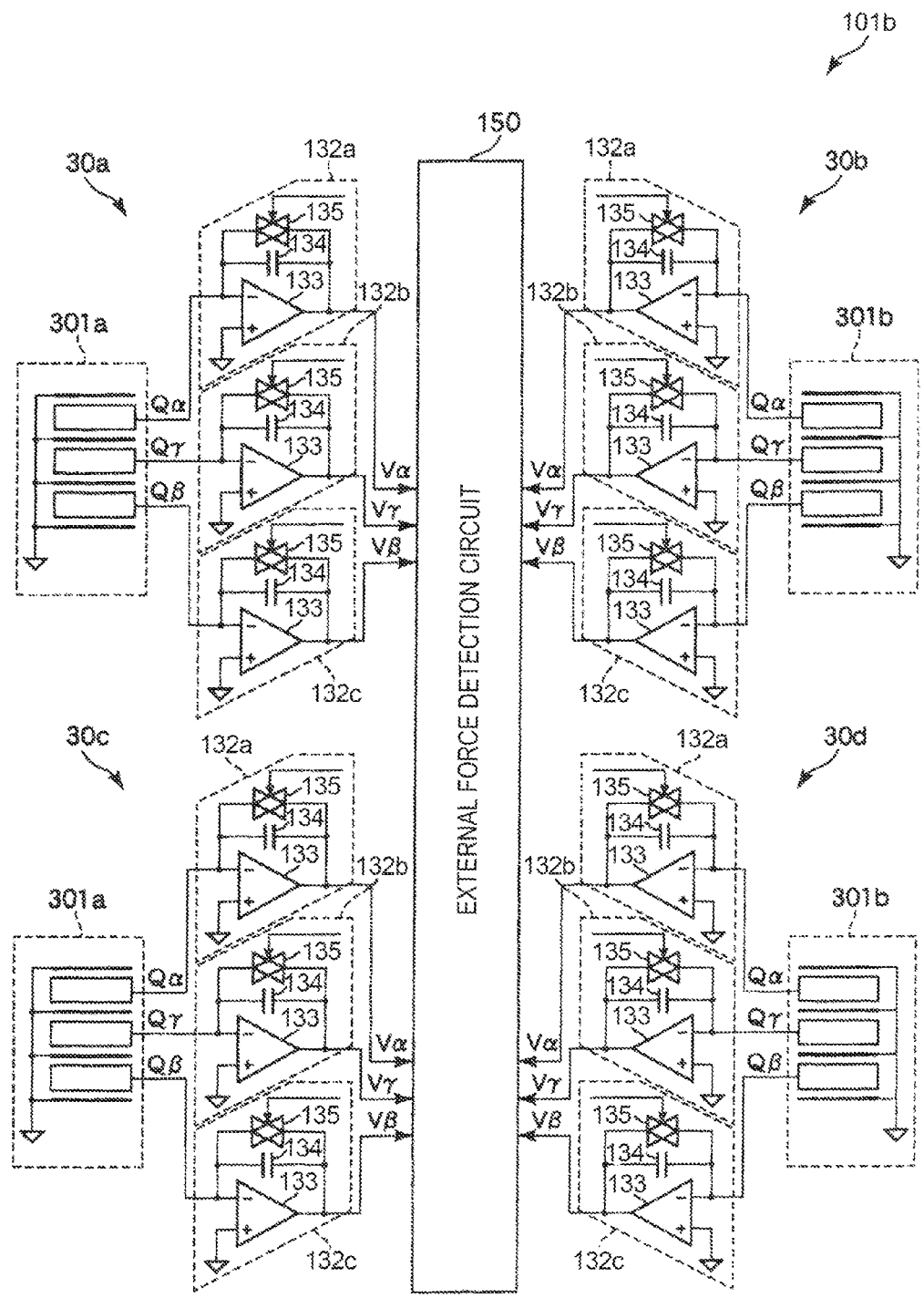
FIG. 11 is a circuit diagram schematically illustrating the force detection device shown in FIGS. 10A and 10B.
Figure 12A:
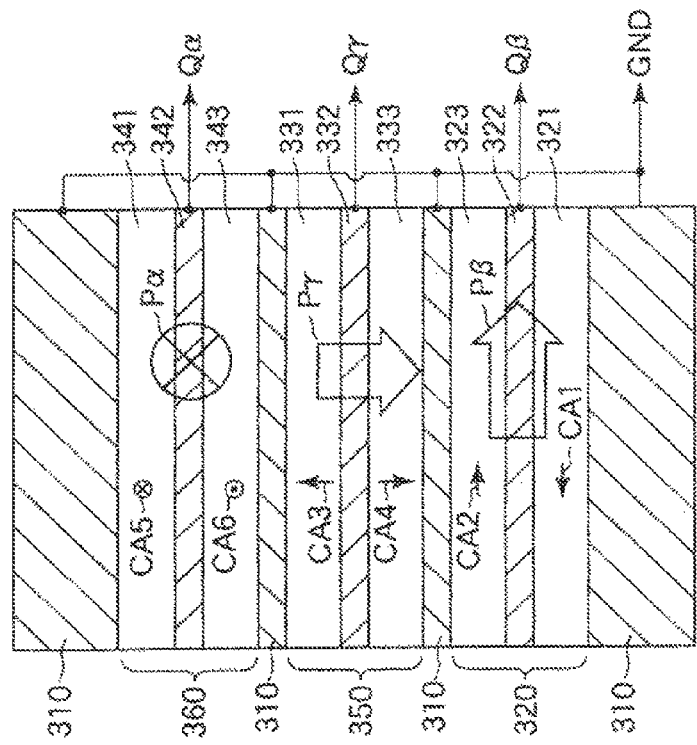
FIGS. 12A and 12B are cross-sectional views schematically illustrating charge output elements of the force detection device shown in FIGS. 10A and 10B.
Figure 12B:
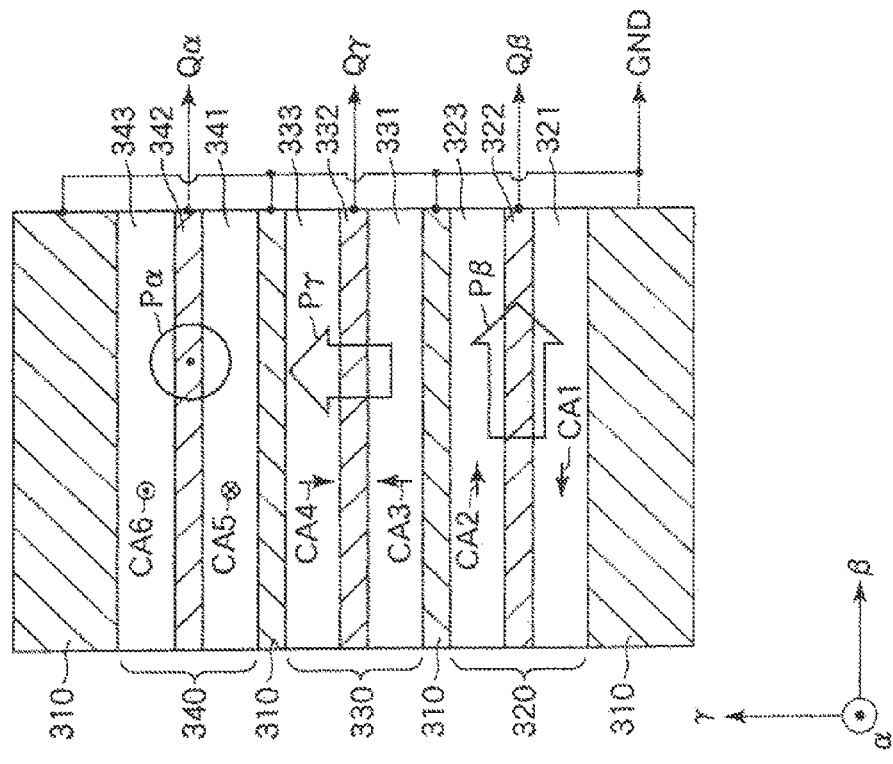

FIG. 10A is a perspective view schematically illustrating the fifth embodiment of the force detection device according to the invention. FIG. 10B is a plan view schematically illustrating the fifth embodiment of the force detection device according to the invention. FIG. 11 is a circuit diagram schematically illustrating the force detection device shown in FIGS. 10A and 10B. FIG. 12A is a cross-sectional view schematically illustrating a charge output element of the first force detection device shown in FIGS. 10A and 10B. FIG. 12B is a cross-sectional view schematically illustrating a charge output element of the second force detection device shown in FIGS. 10A and 10B. Meanwhile, in FIG. 10A, some of the components are shown in perspective for the purpose of description, and in FIG. 10B, some of the components are omitted for the purpose of description.

A force detection device 101b shown in FIGS. 10A and 10B has a function of detecting six-axis forces (translational force components in the directions of the x, y, and z axes and rotational force components around the x, y, and z axes). The force detection device 101b includes a base plate 2, a cover plate 4 provided separately so as to face the base plate 2, force detection elements 30a, 30b, 30c, and 30d, provided (interposed) between the base plate 2 and the cover plate 4, which output voltages Vα, Vβ, and Vγ in accordance with external forces, and an external force detection circuit 50 (not shown in FIG. 10A or 10B; see FIG. 11) that detects the six-axis forces on the basis of the voltages Vα, Vβ, and Vγ which are output from the force detection elements 30a, 30b, 30c, and 30d, respectively.

Force Detection Element

The force detection elements 30a, 30b, 30c, and 30d have functions of outputting the voltages Vα, Vβ, and Vγ in accordance with the respective external forces applied along three axes (α-axis, β-axis, and γ-axis) orthogonal to each other. In addition, the force detection elements 30a and 30c constitute a first element pair, and the force detection elements 30b and 30d constitute a second element pair. The force detection elements 30a and 30c belonging to the first element pair have the same configuration. The force detection elements 30b and 30d belonging to the second element pair have the same configuration.

As shown in FIG. 11, the force detection elements 30a and 30c belonging to the first element pair include a first charge output element 301a that outputs charges Qα, Qβ, and Qγ in accordance with the external forces applied along the three axes (α-axis, β-axis, and γ-axis) orthogonal to each other, a conversion and output circuit 132a that converts the charge Qα which is output from the first charge output element 301a into the voltage Vα, a conversion and output circuit 132b that converts the charge Qγ which is output from the first charge output element 301a into the voltage Vγ, and a conversion and output circuit 132c that converts the charge Qβ which is output from the first charge output element 301a into the voltage Vβ. The force detection elements 30b and 30d belonging to the second element pair have the same configuration as that of the force detection elements 30a and 30c belonging to the first element pair, except that each of the force detection elements includes a second charge output element 301b having a structure different from that of the first charge output element 301a.

Charge Output Element

The first charge output element 301a shown in FIG. 12A has a function of outputting the charges Qα, Qβ, and Qγ in accordance with the respective external forces applied along the three axes (α-axis, β-axis, and γ-axis) orthogonal to each other in FIGS. 12A and 12B. As shown in FIG. 12A, the first charge output element 301a includes four ground electrode layers 310 grounded to a ground (reference potential point) GND, a β-axis piezoelectric substance 320 that outputs the charge Qβ in accordance with an external force (shearing force) parallel or substantially parallel to the β-axis, a first γ-axis piezoelectric substance 330 that outputs the charge Qγ in accordance with an external force (compressive/tensile force) parallel or substantially parallel to the γ-axis, and a first α-axis piezoelectric substance 340 that outputs the charge Qα in accordance with an external force (shearing force) parallel or substantially parallel to the α-axis, and the ground electrode layers 310 and each of the piezoelectric substances 320, 330, and 340 are alternately laminated. Meanwhile, in FIGS. 12A and 12B, the lamination direction of the ground electrode layers 310 and each of the piezoelectric substances 320, 330, and 340 is set to a γ-axis direction, and the directions which are orthogonal to the γ-axis direction and are orthogonal to each other are set to an α-axis direction and a β-axis direction, respectively.

In the shown configuration, the β-axis piezoelectric substance 320, the first γ-axis piezoelectric substance 330, and the first α-axis piezoelectric substance 340 are laminated in this order from the lower side in FIGS. 12A and 12B, but the invention is not limited thereto. The lamination order of the piezoelectric substances 320, 330, and 340 is arbitrary.

The β-axis piezoelectric substance 320 has a function of outputting the charge Qβ in accordance with the external force (shearing force) parallel or substantially parallel to the β-axis. The β-axis piezoelectric substance 320 has the same structure and function as those of the β-axis piezoelectric substance 320 of the above-mentioned fourth embodiment.

The first γ-axis piezoelectric substance 330 has a function of outputting the charge Qγ in accordance with the external force (compressive/tensile force) parallel or substantially parallel to the γ-axis. The first γ-axis piezoelectric substance 330 is configured to output positive charge in accordance with an external force applied along the positive direction of the γ-axis, and to output negative charge in accordance with an external force applied along the negative direction of the γ-axis. That is, the first γ-axis piezoelectric substance 330 has a electric axis Pγ facing the positive direction of the γ-axis in FIGS. 12A and 12B.

The first γ-axis piezoelectric substance 330 includes a third piezoelectric plate 331 having a third crystal axis CA3, a fourth piezoelectric plate 333, provided facing the third piezoelectric plate 331, which has a fourth crystal axis CA4, and an internal electrode 332, provided between the third piezoelectric plate 331 and the fourth piezoelectric plate 333, which outputs the charge Qγ. In addition, the lamination order of the respective layers constituting the first γ-axis piezoelectric substance 330 is the order of the third piezoelectric plate 331, the internal electrode 332, and the fourth piezoelectric plate 333 from the lower side in FIGS. 12A and 12B.

The third piezoelectric plate 331 is constituted by a piezoelectric substance having the third crystal axis CA3 oriented in the positive direction of the γ-axis. When the external force along the positive direction of the γ-axis is applied to the surface of the third piezoelectric plate 331, charge is induced into the third piezoelectric plate 331 by a piezoelectric effect. As a result, positive charge is collected in the vicinity of the surface of the third piezoelectric plate 331 on the internal electrode 332 side, and negative charge is collected in the vicinity of the surface of the third piezoelectric plate 331 on the ground electrode layer 310 side. Similarly, when the external force along the negative direction of the γ-axis is applied to the surface of the third piezoelectric plate 331, negative charge is collected in the vicinity of the surface of the third piezoelectric plate 331 on the internal electrode 332 side, and positive charge is collected in the vicinity of the surface of the third piezoelectric plate 331 on the ground electrode layer 310 side.

The fourth piezoelectric plate 333 is constituted by a piezoelectric substance having the fourth crystal axis CA4 oriented in the negative direction of the γ-axis. When the external force along the positive direction of the γ-axis is applied to the surface of the fourth piezoelectric plate 333, charge is induced into the fourth piezoelectric plate 333 by a piezoelectric effect. As a result, positive charge is collected in the vicinity of the surface of the fourth piezoelectric plate 333 on the internal electrode 332 side, and negative charge is collected in the vicinity of the surface of the fourth piezoelectric plate 333 on the ground electrode layer 310 side. Similarly, when the external force along the negative direction of the γ-axis is applied to the surface of the fourth piezoelectric plate 333, negative charge is collected in the vicinity of the surface of the fourth piezoelectric plate 333 on the internal electrode 332 side, and positive charge is collected in the vicinity of the surface of the fourth piezoelectric plate 333 on the ground electrode layer 310 side.

As constituent materials of the third piezoelectric plate 331 and the fourth piezoelectric plate 333, the same constituent materials as those of the first piezoelectric plate 321 and the second piezoelectric plate 323 can be used. In addition, the piezoelectric plate, such as the third piezoelectric plate 331 and the fourth piezoelectric plate 333, which generates charge by the external force (compressive/tensile force) perpendicular to the surface direction of the layer can be formed of X cut quartz crystal.

The internal electrode 332 has a function of outputting positive charge or negative charge, generated within the third piezoelectric plate 331 and the fourth piezoelectric plate 333, as the charge Qγ. As described above, when the external force along the positive direction of the γ-axis is applied to the surface of the third piezoelectric plate 331 or the surface of the fourth piezoelectric plate 333, positive charge is collected in the vicinity of the internal electrode 332. As a result, positive charge Qγ is output from the internal electrode 332. On the other hand, when the external force along the negative direction of the γ-axis is applied to the surface of the third piezoelectric plate 331 or the surface of the fourth piezoelectric plate 333, negative charge is collected in the vicinity of the internal electrode 332. As a result, negative charge Qγ is output from the internal electrode 332.

The first α-axis piezoelectric substance 340 has a function of outputting the charge Qα in accordance with the external force (shearing force) parallel or substantially parallel to the α-axis. The first α-axis piezoelectric substance 340 is configured to output positive charge in accordance with the external force applied along the positive direction of the α-axis, and to output negative charge in accordance with the external force applied along the negative direction of the α-axis. That is, the first α-axis piezoelectric substance 340 has a electric axis Pα facing the positive direction of the α-axis in FIGS. 12A and 12B.

The first α-axis piezoelectric substance 340 includes a fifth piezoelectric plate 341 having a fifth crystal axis CA5, a sixth piezoelectric plate 343, provided facing the fifth piezoelectric plate 341, which has a sixth crystal axis CA6, and an internal electrode 342, provided between the fifth piezoelectric plate 341 and the sixth piezoelectric plate 343, which outputs the charge Qα. In addition, the lamination order of the respective layers constituting the first α-axis piezoelectric substance 340 is the order of the fifth piezoelectric plate 341, the internal electrode 342, and the sixth piezoelectric plate 343 from the lower side in FIGS. 12A and 12B.

The fifth piezoelectric plate 341 is constituted by a piezoelectric substance having the fifth crystal axis CA5 oriented in the negative direction of the α-axis. When the external force along the positive direction of the α-axis is applied to the surface of the fifth piezoelectric plate 341, charge is induced into the fifth piezoelectric plate 341 by a piezoelectric effect. As a result, positive charge is collected in the vicinity of the surface of the fifth piezoelectric plate 341 on the internal electrode 342 side, and negative charge is collected in the vicinity of the surface of the fifth piezoelectric plate 341 on the ground electrode layer 310 side. Similarly, when the external force along the negative direction of the α-axis is applied to the surface of the fifth piezoelectric plate 341, negative charge is collected in the vicinity of the surface of the fifth piezoelectric plate 341 on the internal electrode 342 side, and positive charge is collected in the vicinity of the surface of the fifth piezoelectric plate 341 on the ground electrode layer 310 side.

The sixth piezoelectric plate 343 is constituted by a piezoelectric substance having the sixth crystal axis CA6 oriented in the positive direction of the α-axis. When the external force along the positive direction of the α-axis is applied to the surface of the sixth piezoelectric plate 343, charge is induced into the sixth piezoelectric plate 343 by a piezoelectric effect. As a result, positive charge is collected in the vicinity of the surface of the sixth piezoelectric plate 343 on the internal electrode 342 side, and negative charge is collected in the vicinity of the surface of the sixth piezoelectric plate 343 on the ground electrode layer 310 side. Similarly, when the external force along the negative direction of the α-axis is applied to the surface of the sixth piezoelectric plate 343, negative charge is collected in the vicinity of the surface of the sixth piezoelectric plate 343 on the internal electrode 342 side, and positive charge is collected in the vicinity of the surface of the sixth piezoelectric plate 343 on the ground electrode layer 310 side.

As constituent materials of the fifth piezoelectric plate 341 and the sixth piezoelectric plate 343, the same constituent materials as those of the first piezoelectric plate 321 and the second piezoelectric plate 323 can be used. In addition, the piezoelectric plate, such as the fifth piezoelectric plate 341 and the sixth piezoelectric plate 343, which generates charge by the external force (shearing force) applied along the surface direction of the layer can be formed of Y cut quartz crystal, similarly to the first piezoelectric plate 321 and the second piezoelectric plate 323.

The internal electrode 342 has a function of outputting positive charge or negative charge, generated within the fifth piezoelectric plate 341 and the sixth piezoelectric plate 343, as the charge Qα. As described above, when the external force along the positive direction of the α-axis is applied to the surface of the fifth piezoelectric plate 341 or the surface of the sixth piezoelectric plate 343, positive charge is collected in the vicinity of the internal electrode 342. As a result, positive charge Qα is output from the internal electrode 342. On the other hand, when the external force along the negative direction of the α-axis is applied to the surface of the fifth piezoelectric plate 341 or the surface of the sixth piezoelectric plate 343, negative charge is collected in the vicinity of the internal electrode 342. As a result, negative charge Qα is output from the internal electrode 342.

The β-axis piezoelectric substance 320, the first γ-axis piezoelectric substance 330, and the first α-axis piezoelectric substance 340 are laminated so that the direction of the electric axis Pβ of the β-axis piezoelectric substance 320, the direction of the electric axis Pγ of the first γ-axis piezoelectric substance 330, and the direction of the electric axis Pα of the first α-axis piezoelectric substance 340 are orthogonal to each other. Thereby, the first charge output element 301a can have three electric axes Pα, Pβ, and Pγ, and can output three charges Qα, Qβ, and Qγ in accordance with the respective external forces applied along three axes (α-axis, β-axis, and γ-axis).

Next, the second charge output element 301b included in each of the force detection elements 30b and 30d belonging to the second element pair will be described in detail with reference to FIG. 12B. The second charge output element 301b shown in FIG. 12B has a function of outputting the charges Qα, Qβ, and Qγ in accordance with the respective external forces along the three axes (α-axis, β-axis, and γ-axis) orthogonal to each other in FIGS. 12A and 12B. As shown in FIG. 12B, the second charge output element 301b includes four ground electrode layers 310 grounded to a ground (reference potential point) GND, the β-axis piezoelectric substance 320 that outputs the charge Qβ in accordance with the external force (shearing force) parallel or substantially parallel to the β-axis, a second γ-axis piezoelectric substance 350 that outputs the charge Qγ in accordance with the external force (compressive/tensile force) parallel or substantially parallel to the γ-axis, and a second α-axis piezoelectric substance 360 that outputs the charge Qα in accordance with the external force (shearing force) parallel or substantially parallel to the α-axis, and the ground electrode layers 310 and each of the piezoelectric substances 320, 350, and 360 are alternately laminated. Therefore, the second charge output element 301b has the same structure as that of the first charge output element 301a, except that the second charge output element includes the second γ-axis piezoelectric substance 350 having a structure different from that of the first γ-axis piezoelectric substance 330 and the second α-axis piezoelectric substance 360 having a structure different from that of the first α-axis piezoelectric substance 340. Meanwhile, in FIGS. 12A and 12B, the lamination direction of the ground electrode layers 310 and each of the piezoelectric substances 320, 350, and 360 is set to a γ-axis direction, and the directions which are orthogonal to the γ-axis direction and are orthogonal to each other are set to an α-axis direction and a β-axis direction, respectively.

In the shown configuration, the β-axis piezoelectric substance 320, the second γ-axis piezoelectric substance 350, and the second α-axis piezoelectric substance 360 are laminated in this order from the lower side in FIGS. 12A and 12B, but the invention is not limited thereto. The lamination order of the piezoelectric substances 320, 350, and 360 is arbitrary.

The second γ-axis piezoelectric substance 350 has a function of outputting the charge Qγ in accordance with the external force (compressive/tensile force) parallel or substantially parallel to the γ-axis. The second γ-axis piezoelectric substance 350 is configured to output negative charge in accordance with the external force applied along the positive direction of the γ-axis, and to output positive charge in accordance with the external force applied along the negative direction of the γ-axis. That is, the second γ-axis piezoelectric substance 350 has the electric axis Pγ facing the negative direction of the γ-axis in FIGS. 12A and 12B. Therefore, the direction of the electric axis Pγ of the second γ-axis piezoelectric substance 350 is opposite to the direction of the electric axis Pγ of the first γ-axis piezoelectric substance 330.

The second γ-axis piezoelectric substance 350 includes the fourth piezoelectric plate 333 having the fourth crystal axis CA4, the third piezoelectric plate 331, provided facing the fourth piezoelectric plate 333, which has the third crystal axis CA3, and the internal electrode 332, provided between the fourth piezoelectric plate 333 and the third piezoelectric plate 331, which outputs the charge Qγ. In addition, the lamination order of the respective layers constituting the second γ-axis piezoelectric substance 350 is the order of the fourth piezoelectric plate 333, the internal electrode 332, and the third piezoelectric plate 331 from the lower side in FIGS. 12A and 12B. Therefore, the second γ-axis piezoelectric substance 350 has the same structure as that of the first γ-axis piezoelectric substance 330, except for the lamination order of the fourth piezoelectric plate 333, the internal electrode 332, and the third piezoelectric plate 331.

When the external force applied along the positive direction of the γ-axis is applied to the surface of the fourth piezoelectric plate 333, charge is induced into the fourth piezoelectric plate 333 by a piezoelectric effect. As a result, negative charge is collected in the vicinity of the surface of the fourth piezoelectric plate 333 on the internal electrode 332 side, and positive charge is collected in the vicinity of the surface of the fourth piezoelectric plate 333 on the ground electrode layer 310 side. Similarly, when the external force along the negative direction of the γ-axis is applied to the surface of the fourth piezoelectric plate 333, positive charge is collected in the vicinity of the surface of the fourth piezoelectric plate 333 on the internal electrode 332 side, and negative charge is collected in the vicinity of the surface of the fourth piezoelectric plate 333 on the ground electrode layer 310 side.

When the external force along the positive direction of the γ-axis is applied to the surface of the third piezoelectric plate 331, charge is induced into the third piezoelectric plate 331 by a piezoelectric effect. As a result, negative charge is collected in the vicinity of the surface of the third piezoelectric plate 331 on the internal electrode 332 side, and positive charge is collected in the vicinity of the surface of the third piezoelectric plate 331 on the ground electrode layer 310 side. Similarly, when the external force along the negative direction of the γ-axis is applied to the surface of the third piezoelectric plate 331, positive charge is collected in the vicinity of the surface of the third piezoelectric plate 331 on the internal electrode 332 side, and negative charge is collected in the vicinity of the surface of the third piezoelectric plate 331 on the ground electrode layer 310 side.

In this manner, when the external force along the positive direction of the γ-axis is applied to the surface of the third piezoelectric plate 331 or the surface of the fourth piezoelectric plate 333, negative charge is collected in the vicinity of the internal electrode 332. As a result, negative charge Qγ is output from the internal electrode 332. On the other hand, when the external force along the negative direction of the γ-axis is applied to the surface of the third piezoelectric plate 331 or the surface of the fourth piezoelectric plate 333, positive charge is collected in the vicinity of the internal electrode 332. As a result, positive charge Qγ is output from the internal electrode 332.

The second α-axis piezoelectric substance 360 has a function of outputting the charge Qα in accordance with the external force (shearing force) parallel or substantially parallel to the α-axis. The second α-axis piezoelectric substance 360 is configured to output negative charge in accordance with the external force along the positive direction of the α-axis, and to output positive charge in accordance with the external force applied along the negative direction of the α-axis. That is, the second α-axis piezoelectric substance 360 has the electric axis Pα facing the negative direction of the α-axis in FIGS. 12A and 12B. Therefore, the direction of the electric axis Pα of the second α-axis piezoelectric substance 360 is opposite to the direction of the electric axis Pα of the first α-axis piezoelectric substance 340.

The second α-axis piezoelectric substance 360 includes the sixth piezoelectric plate 343 having the sixth crystal axis CA6, the fifth piezoelectric plate 341, provided facing the sixth piezoelectric plate 343, which has the fifth crystal axis CA5, and the internal electrode 342, provided between the sixth piezoelectric plate 343 and the fifth piezoelectric plate 341, which outputs the charge Qα. In addition, the lamination order of the respective layers constituting the second α-axis piezoelectric substance 360 is the order of the sixth piezoelectric plate 343, the internal electrode 342, and the fifth piezoelectric plate 341 from the lower side in FIGS. 12A and 12B. Therefore, the second α-axis piezoelectric substance 360 has the same structure as that of the first α-axis piezoelectric substance 340, except for the lamination order of the sixth piezoelectric plate 343, the internal electrode 342, and the fifth piezoelectric plate 341.

When the external force along the positive direction of the α-axis is applied to the surface of the sixth piezoelectric plate 343, charge is induced into the sixth piezoelectric plate 343 by a piezoelectric effect. As a result, negative charge is collected in the vicinity of the surface of the sixth piezoelectric plate 343 on the internal electrode 342 side, and positive charge is collected in the vicinity of the surface of the sixth piezoelectric plate 343 on the ground electrode layer 310 side. Similarly, when the external force along the negative direction of the α-axis is applied to the surface of the sixth piezoelectric plate 343, positive charge is collected in the vicinity of the surface of the sixth piezoelectric plate 343 on the internal electrode 342 side, and negative charge is collected in the vicinity of the surface of the sixth piezoelectric plate 343 on the ground electrode layer 310 side.

When the external force along the positive direction of the α-axis is applied to the surface of the fifth piezoelectric plate 341, charge is induced into the fifth piezoelectric plate 341 by a piezoelectric effect. As a result, negative charge is collected in the vicinity of the surface of the fifth piezoelectric plate 341 on the internal electrode 342 side, and positive charge is collected in the vicinity of the surface of the fifth piezoelectric plate 341 on the ground electrode layer 310 side. Similarly, when the external force along the negative direction of the α-axis is applied to the surface of the fifth piezoelectric plate 341, positive charge is collected in the vicinity of the surface of the fifth piezoelectric plate 341 on the internal electrode 342 side, and negative charge is collected in the vicinity of the surface of the fifth piezoelectric plate 341 on the ground electrode layer 310 side.

In this manner, when the external force along the positive direction of the α-axis is applied to the surface of the fifth piezoelectric plate 341 or the surface of the sixth piezoelectric plate 343, negative charge is collected in the vicinity of the internal electrode 342. As a result, negative charge Qα is output from the internal electrode 342. On the other hand, when the external force along the negative direction of the α-axis is applied to the surface of the fifth piezoelectric plate 341 or the surface of the sixth piezoelectric plate 343, positive charge is collected in the vicinity of the internal electrode 342. As a result, positive charge Qα is output from the internal electrode 322.

The β-axis piezoelectric substance 320, the second γ-axis piezoelectric substance 350, and the second α-axis piezoelectric substance 360 are laminated so that the direction of the electric axis Pβ of the β-axis piezoelectric substance 320, the direction of the electric axis Pγ of the second γ-axis piezoelectric substance 350, and the direction of the electric axis Pα of the second α-axis piezoelectric substance 360 are orthogonal to each other. In addition, the direction of the electric axis Pγ of the second γ-axis piezoelectric substance 350 is opposite to the direction of the electric axis Pγ of the first γ-axis piezoelectric substance 330. Similarly, the direction of the electric axis Pα of the second α-axis piezoelectric substance 360 is opposite to the direction of the electric axis Pα of the first α-axis piezoelectric substance 340.

In addition, the amount of charge generation per unit force of the β-axis piezoelectric substance 320, the first α-axis piezoelectric substance 340 and the second α-axis piezoelectric substance 360 which are formed of Y cut quartz crystal is, for example, 8 pC/N. On the other hand, the amount of charge generation per unit force of the first γ-axis piezoelectric substance 330 and the second γ-axis piezoelectric substance 350 which are formed of X cut quartz crystal is, for example, 4 pC/N. In this manner, the sensitivity of the first charge output element 301a and the second charge output element 301b to the external force (compressive/tensile force) parallel or substantially parallel to the γ-axis becomes equal to or less than the sensitivity of the first charge output element 301a and the second charge output element 301b to the external force (shearing force) parallel or substantially parallel to the α-axis or the β-axis. For this reason, the charge Qγ which is output from the first charge output element 301a and the second charge output element 301b becomes equal to or less than the charge Qα and the charge Qβ which are output from the first charge output element 301a and the second charge output element 301b.

Conversion and Output Circuit

The conversion and output circuits 132a and 132c have the same configuration as that of the conversion and output circuit 132 of the fourth embodiment. The conversion and output circuit 132b has the same configuration as that of the conversion and output circuit 132 of the fourth embodiment, except for the capacitance of the capacitor 134. The conversion and output circuit 132a has a function of converting the charge Qα which is output from the first charge output element 301a or the second charge output element 301b into the voltage Vα. The conversion and output circuit 132b has a function of converting the charge Qγ which is output from the first charge output element 301a or the second charge output element 301b into the voltage Vγ. The conversion and output circuit 132c has a function of converting the charge Qβ which is output from the first charge output element 301a or the second charge output element 301b into the voltage Vβ.

The same drive circuit may be connected to the switching elements 135 of the respective conversion and output circuits 132a, 132b, and 132c, and different drive circuits may be connected thereto. All synchronized on/off signals are input to the respective switching elements 135 from the drive circuit. Thereby, the operations of the switching elements 135 of the respective conversion and output circuits 132a, 132b, and 132c are synchronized with each other. That is, the on/off timings of the switching elements 135 of the respective conversion and output circuits 132a, 132b, and 132c are consistent with each other.

In addition, when the capacitance of the capacitor 134 is reduced in the circuit, such as the conversion and output circuits 132a, 132b, and 132c, which has a voltage conversion function, voltage conversion sensitivity is improved, but the amount of saturated charge is reduced. As described above, generally, the charge $Q\gamma$ which is output from the first charge output element 301a and the second charge output element 301b is equal to or less than the charge $Q\alpha$ and the charge $Q\beta$ which are output from the first charge output element 301a and the second charge output element 301b. Therefore, from the viewpoint of sensitivity to the charge $Q\gamma$, it is preferable that the capacitance C2 of the capacitor 134 of the conversion and output circuit 132b is equal to or less than the capacitance C1 of the capacitor 134 of the conversion and output circuits 132a and 132c. Thereby, it is possible to accurately convert the charge $Q\gamma$ into the voltage $V\gamma$.

In addition, the switching elements 135 of the respective conversion and output circuits 132a, 132b, and 132c are the same semiconductor switching elements as each other, the leakage currents of the respective switching elements 135 are substantially equal to each other. Therefore, the output drifts D of the respective switching elements 135 are also substantially equal to each other.

Next, the positional relations between the force detection elements 30a and 30c constituting the first element pair and the force detection elements 30b and 30d constituting the second element pair will be described in detail with reference to FIG. 10B. Meanwhile, in FIG. 10B, the cover plate 4 is omitted for the purpose of description. In addition, in FIG. 10B, a horizontal direction is set to an x-axis direction, a direction orthogonal to the x-axis direction, that is, a vertical direction is set to a y-axis direction, and a direction orthogonal to the x-axis direction and the y-axis direction is set to a z-axis direction.

The force detection element 30a has electric axes $P\alpha 1$, $P\beta 1$, and $P\gamma 1$, and outputs voltages $V\alpha 1$, $V\beta 1$, and $V\gamma 1$ in accordance with external forces applied along the $\alpha$-axis, the $\beta$-axis, and the $\gamma$-axis, respectively. The force detection element 30b has electric axes $P\alpha 2$, $P\beta 2$, and $P\gamma 2$, and outputs voltages $V\alpha 2$, $V\beta 2$, and $V\gamma 2$ in accordance with the external forces applied along the $\alpha$-axis, the $\beta$-axis, and the $\gamma$-axis, respectively. The force detection element 30c has electric axes $P\alpha 3$, $P\beta 3$, and $P\gamma 3$, and outputs voltages $V\alpha 3$, $V\beta 3$, and $V\gamma 3$ in accordance with the external forces applied along the $\alpha$-axis, the $\beta$-axis, and the $\gamma$-axis, respectively. Similarly, the force detection element 30d has electric axes $P\alpha 4$, $P\beta 4$, and $P\gamma 4$, and outputs voltages $V\alpha 4$, $V\beta 4$, and $V\gamma 4$ in accordance with the external forces applied along the $\alpha$-axis, the $\beta$-axis, and the $\gamma$-axis, respectively. In addition, voltage components (true values) $V\alpha t$, $V\beta t$, and $V\gamma t$ proportional to the amount of charge accumulated in the capacitor 134, and the output drift D caused by the leakage current of the switching element 135 are respectively included in the voltages $V\alpha$, $V\beta$, and $V\gamma$ which are output by the force detection elements 30a, 30b, 30c, and 30d.

The force detection elements 30a, 30b, 30c, and 30d are provided (interposed) between the base plate 2 and the cover plate 4 provided separately from the base plate 2. The electric axis $P\beta 1$ of the force detection element 30a has an angle $\theta 1$. The electric axis $P\beta 2$ of the force detection element 30b has an angle $\theta 2$. The electric axis $P\beta 3$ of the force detection element 30c has an angle $\theta 3$. The electric axis $P\beta 4$ of the force detection element 30d has an angle $\theta 4$. Meanwhile, the angles $\theta 1$, $\theta 2$, $\theta 3$, and $\theta 4$ are angles from the x-axis of the reference coordinate system (x-axis, y-axis, and z-axis) of FIG. 10B.

As shown in FIG. 10B, the force detection elements 30a and 30c constituting the first element pair are disposed so that the directions of the electric axes $P\alpha 1$ and $P\beta 1$ of the force detection element 30a and the directions of the electric axes $P\alpha 3$ and $P\beta 3$ of the force detection element 30c are opposite to each other. Similarly, the force detection elements 30b and 30d constituting the second element pair are disposed so that the directions of the electric axes $P\alpha 2$ and $P\beta 2$ of the force detection element 30b and the directions of the electric axes $P\alpha 4$ and $P\beta 4$ of the force detection element 30d are opposite to each other. In addition, the directions of the electric axes $P\gamma 1$ and $P\gamma 3$ of the force detection elements 30a and 30c constituting the first element pair and the directions of the electric axes $P\gamma 2$ and $P\gamma 4$ of the force detection elements 30b and 30d constituting the second element pair are opposite to each other.

Since the force detection elements 30a and 30c are disposed so that the direction of the electric axis $P\beta 1$ of the force detection element 30a and the direction of the electric axis $P\beta 2$ of the force detection element 30c are opposite to each other, the sign of a voltage component $V\beta t1$ included in the voltage $V\beta 1$ and the sign of a voltage component $V\beta t3$ included in the voltage $V\beta 3$ are not consistent with each other. Therefore, when the difference between the voltage $V\beta 1$ which is output from the force detection element 30a and the voltage $V\beta 3$ which is output from the force detection element 30c is taken, the absolute value of the difference between the voltage component $V\beta t1$ and the voltage component $V\beta t3$ does not decrease. Similarly, since the force detection elements 30a and 30c are disposed so that the direction of the electric axis $P\alpha 1$ of the force detection element 30a and the direction of the electric axis $P\beta 2$ of the force detection element 30c are opposite to each other, the sign of a voltage component $V\alpha t1$ included in the voltage $V\alpha 1$ and the sign of a voltage component $V\alpha t3$ included in the voltage $V\alpha 3$ are not consistent with each other. Therefore, when the difference between the voltage $V\alpha 1$ which is output from the force detection element 30a and the voltage $V\alpha 3$ which is output from the force detection element 30c is taken, the absolute value of the difference between the voltage component $V\alpha t1$ and the voltage component $V\alpha t3$ does not decrease.

In addition, since the force detection elements 30b and 30d are disposed so that the direction of the electric axis $P\beta 2$ of the force detection element 30b and the direction of the electric axis $P\beta 4$ of the force detection element 30d are opposite to each other, the sign of a voltage component $V\beta t2$ included in the voltage $V\beta 2$ and the sign of a voltage component $V\beta t4$ included in the voltage $V\beta 4$ are not consistent with each other. Therefore, when the difference between the voltage $V\beta 2$ which is output from the force detection element 30b and the voltage $V\beta 4$ which is output from the force detection element 30d is taken, the absolute value of the difference between the voltage component $V\beta t2$ and the voltage component $V\beta t4$ does not decrease. Similarly, since the force detection elements 30b and 30d are disposed so that the direction of the electric axis $P\alpha 2$ of the force detection element 30b and the direction of the electric axis $P\alpha 4$ of the force detection element 30d are opposite to each other, the sign of a voltage component $V\alpha t2$ included in the voltage $V\alpha 2$ and the sign of a voltage component $V\alpha t4$ included in the voltage $V\alpha 4$ are not consistent with each other. Therefore, when the difference between the voltage $V\alpha 2$ which is output from the force detection element 30b and the voltage $V\alpha 4$ which is output from the force detection element 30d is taken, the absolute value of the difference between the voltage component $V\alpha t2$ and the voltage component $V\alpha t4$ does not decrease.

In addition, as described above, since the force detection elements 30a, 30c, 30b, and 30d are configured such that the directions of the electric axes $P\gamma 1$ and $P\gamma 3$ of the force detection elements 30a and 30c and the direction of the electric axes $P\gamma 2$ and $P\gamma 4$ of the force detection elements 30b and 30d are opposite to each other, the sign of voltage components $V\gamma t1$ and $V\gamma t3$ included in the voltages $V\gamma 1$ and $V\gamma 3$ and the sign of voltage components $V\gamma t2$ and $V\gamma t4$ included in the voltages $V\gamma 2$ and $V\gamma 4$ are not consistent with each other. Therefore, when the differences between the voltages $V\gamma 1$ and $V\gamma 3$ which are output from the force detection elements 30a and 30c and the voltages $V\gamma 2$ and $V\gamma 4$ which are output from the force detection elements 30b and 30d are taken, the absolute values of these differences do not decrease.

On the other hand, since the output drifts D included in the voltages $V\alpha$, $V\beta$, and $V\gamma$ which are output from the force detection elements 30a, 30b, 30c, and 30d are independent of the directions of the electric axes $P\alpha$, $P\beta$, and $P\gamma$, the signs of the output drifts D included in the voltages $V\alpha$, $V\beta$, and $V\gamma$ are consistent with each other. Therefore, when the difference between the output drifts D is taken, the absolute value of the difference decreases.

In addition, it is preferable that the force detection elements 30a and 30c constituting the first element pair are disposed so that the direction of the electric axis $P\beta 1$ and the direction of the electric axis $P\beta 3$ face each other, that is, the relation of $\theta 1 = \theta 3$ is satisfied. Similarly, it is preferable that the force detection elements 30b and 30d constituting the second element pair are disposed so that the direction of the electric axis $P\beta 2$ and the direction of the electric axis $P\beta 4$ face each other, that is, the relation of $\theta 2 = \theta 4$ is satisfied. Thereby, an external force detection circuit 150 described later can detect six-axis forces while reducing the output drift D.

In addition, it is more preferable that the force detection elements 30a, 30b, 30c, and 30d are disposed so that the directions of the electric axes $P\beta 1$ and $P\beta 3$ of the force detection elements 30a and 30c constituting the first element pair and the directions of the electric axes $P\beta 2$ and $P\beta 4$ of the force detection elements 30b and 30d constituting the second element pair are orthogonal to each other. Thereby, the external force detection circuit 150 described later can detect six-axis forces while further reducing the output drift D.

In addition, when the force detection elements are disposed so that the direction of the electric axis $P\beta 1$ of the force detection element 30a and the direction of the electric axis $P\beta 3$ of the force detection element 30c are opposite to each other, the arrangement of the force detection elements 30a and 30c constituting the first element pair is not particularly limited, but it is preferable that the force detection element 30a and the force detection element 30c are disposed on the same axis A1 as shown in FIG. 10B. Similarly, when the force detection elements are disposed so that the direction of the electric axis $P\beta 2$ of the force detection element 30b and the direction of the electric axis $P\beta 4$ of the force detection element 30d are opposite to each other, the arrangement of the force detection elements 30b and 30d constituting the second element pair is not particularly limited, but it is preferable that the force detection element 30b and the force detection element 30d are disposed on the same axis A2 as shown in FIG. 10B. Thereby, the six-axis forces applied to the base plate 2 or the cover plate 4 can be detected in an unbiased manner.

In addition, the positional relation between the first element pair and the second element pair is not particularly limited. However, as shown in FIG. 10B, it is preferable that the first element pair and the second element pair are disposed so that the axis A1 connecting the center of the force detection element 30a belonging to the first element pair to the center of the force detection element 30c belonging thereto and the axis A2 connecting the center of the force detection element 30b belonging to the second element pair to the center of the force detection element 30d belonging thereto are orthogonal to each other. Thereby, the external forces (external forces applied along the x-axis, the y-axis, and the z-axis in the drawing) applied to the base plate 2 or the cover plate 4 can be detected in an unbiased manner.

In addition, the force detection elements 30a, 30b, 30c, and 30d are preferably disposed at equal angular intervals along the circumferential direction of the base plate 2 or the cover plate 4, and are more preferably disposed at equal intervals concentrically about the central point of the base plate 2 or the cover plate 4. Thereby, the external forces (external forces applied along the x-axis, the y-axis, and the z-axis in the drawing) applied to the base plate 2 or the cover plate 4 can be detected in an unbiased manner.

In addition, in the configuration of FIG. 10B, the electric axes $P\beta 1$, $P\beta 2$, $P\beta 3$, and $P\beta 4$ of the force detection elements 30a, 30b, 30c, and 30d face the outside (centrifugal direction) of the base plate 2, but the invention is not limited thereto. That is, when the force detection elements are disposed so that the direction of the electric axis $P\beta 1$ of the force detection element 30a and the direction of the electric axis $P\beta 3$ of the force detection element 30c are opposite to each other, and the direction of the electric axis $P\beta 2$ of the force detection element 30b and the direction of the electric axis $P\beta 4$ of the force detection element 30d are opposite to each other, the electric axes $P\beta 1$, $P\beta 2$, $P\beta 3$, and $P\beta 4$ of the force detection elements 30a, 30b, 30c, and 30d may face the central direction (centripetal direction) of the base plate 2. Thereby, the electric axes $P\alpha 1$, $P\alpha 2$, $P\alpha 3$, and $P\alpha 4$ of the force detection elements 30a, 30b, 30c, and 30d face the connection direction of a circle centered around the central point of the base plate 2. Therefore, the external force detection circuit 50 described later can easily detect a rotational force component Mz about the z-axis.

External Force Detection Circuit

The external force detection circuit 50 has a function of arithmetically operating six-axis forces of a translational force component (shearing force) Fx in the x-axis direction, a translational force component (shearing force) Fy in the y-axis direction, a translational force component (compressive/tensile force) Fz in the z-axis direction, a rotational force component Mx about the x-axis, a rotational force component My about the y-axis, and a rotational force component Mz about the z-axis by taking the differences between the voltages $V\alpha$, $V\beta$, and $V\gamma$ which are output from the force detection elements 30a, 30b, 30c, and 30d. The respective force components can be obtained by the following expressions. Meanwhile, in order to simplify the expressions, as shown in FIG. 10B, the force detection elements 30a, 30b, 30c, and 30d are disposed concentrically with a radius L centered around the central point of the base plate 2 or the cover plate 4, but the invention is not limited thereto.

$$Fx = \{V\beta 3\cos(\theta 3) - V\beta 1\cos(\theta 1)\} + \{V\beta 2\cos(\theta 2) - V\beta 4\cos(\theta 4)\} +$$
$$\{V\alpha 1\cos(\pi/2 - \theta 1) - V\alpha 3\cos(\pi/2 - \theta 3)\} +$$
$$\{V\alpha 4\cos(\pi/2 - \theta 4) - V\alpha 2\cos(\pi/2 - \theta 2)\} =$$
$$\{V\beta t3\cos(\theta 3) - V\beta t1\cos(\theta 1)\} + \{V\beta t2\cos(\theta 2) - V\beta t4\cos(\theta 4)\} +$$
$$\{V\alpha t1\cos(\pi/2 - \theta 1) - V\alpha t3\cos(\pi/2 - \theta 3)\} +$$
$$\{V\alpha t4\cos(\pi/2 - \theta 4) - V\alpha t2\cos(\pi/2 - \theta 2)\} +$$
$$D\{\cos(\theta 3) - \cos(\theta 1) + \cos(\theta 2) - \cos(\theta 4)\} +$$
$$D\{\cos(\pi/2 - \theta 1) - \cos(\pi/2 - \theta 3) + \cos(\pi/2 - \theta 4) - \cos(\pi/2 - \theta 2)\}$$
$$Fy = \{V\beta 1\sin(\theta 1) - V\beta 3\sin(\theta 3)\} + \{V\beta 2\sin(\theta 2) - V\beta 4\sin(\theta 4)\} +$$
$$\{V\alpha 1\sin(\pi/2 - \theta 1) - V\alpha 3\sin(\pi/2 - \theta 3)\} +$$
$$\{V\alpha 2\sin(\pi/2 - \theta 2) - V\alpha 4\sin(\pi/2 - \theta 4)\} =$$
$$\{V\beta t1\sin(\theta 1) - V\beta t3\sin(\theta 3)\} + \{V\beta t2\sin(\theta 2) - V\beta t4\sin(\theta 4)\} +$$
$$\{V\alpha t1\sin(\pi/2 - \theta 1) - V\alpha t3\sin(\pi/2 - \theta 3)\} +$$
$$\{V\alpha t2\sin(\pi/2 - \theta 2) - V\alpha t4\sin(\pi/2 - \theta 4)\} +$$
$$D\{\sin(\theta 1) - \sin(\theta 3) + \sin(\theta 2) - \sin(\theta 4)\} +$$
$$D\{\sin(\pi/2 - \theta 1) - \sin(\pi/2 - \theta 3) + \sin(\pi/2 - \theta 2) - \sin(\pi/2 - \theta 4)\}$$
$$Fz = V\gamma 1 - V\gamma 2 + V\gamma 3 - V\gamma 4$$
$$= (V\gamma t1 + D) - (V\gamma t2 + D) + (V\gamma t3 + D) - (V\gamma t4 + D)$$
$$= V\gamma t1 - V\gamma t2 + V\gamma t3 - V\gamma t4$$
$$Mx = L \times \{-V\gamma 1\cos(\theta 1 + 3\pi/2) + V\gamma 2\cos(\theta 2 + \pi/2) + V\gamma 3\cos(\theta 3 + 3\pi/2) - V\gamma 4\cos(\theta 4 + \pi/2)\} =$$
$$L \times \{-V\gamma t1\cos(\theta 1 + 3\pi/2) + V\gamma t2\cos(\theta 2 + \pi/2) +$$
$$V\gamma t3\cos(\theta 3 + 3\pi/2) - V\gamma t4\cos(\theta 4 + \pi/2)\} +$$
$$L \times D\{-\cos(\theta 1 + 3\pi/2) + \cos(\theta 2 + \pi/2) +$$
$$\cos(\theta 3 + 3\pi/2) - \cos(\theta 4 + \pi/2)\}$$
$$My = L \times \{V\gamma 1\sin(\theta 1 + \pi/2) + V\gamma 2\sin(\theta 2 + \pi/2) -$$
$$V\gamma 3\sin(\theta 3 + \pi/2) - V\gamma 4\sin(\theta 4 + \pi/2)\} =$$
$$L \times \{V\gamma t1\sin(\theta 1 + \pi/2) + V\gamma t2\sin(\theta 2 + \pi/2) -$$
$$V\gamma t3\sin(\theta 3 + 3\pi/2) - V\gamma t4\sin(\theta 4 + \pi/2)\} + L \times D$$
$$\{\sin(\theta 1 + \pi/2) + \sin(\theta 2 + \pi/2) - \sin(\theta 3 + 3\pi/2) - \sin(\theta 4 + \pi/2)\}$$
$$Mz = L \times \{V\alpha 1 - V\alpha 2 + V\alpha 3 - V\alpha 4\}$$
$$= L \times \{(V\alpha t1 + D) - (V\alpha t2 + D) + (V\alpha t3 + D) - (V\alpha t4 + D)\}$$
$$= L \times \{V\alpha t1 - V\alpha t2 + V\alpha t3 - V\alpha t4\}$$

Herein, L is a constant.

In this manner, the differences between the voltages Vα, Vβ, and Vγ which are output from the force detection elements 30a, 30b, 30c, and 30d are taken, and thus the absolute value of the differences between the voltage components (true values) Vαt, Vβt, and Vγt proportional to the amount of charge accumulated in the capacitor 134 is not reduced, but the absolute value of the output drift D can be reduced. As a result, it is possible to reduce the output drift D, and to improve the detection accuracy and detection resolution of the force detection device 101b. In addition, a method of reducing the above-mentioned output drift D is effective even when the measurement time gets longer, and thus it is possible to lengthen the measurement time of the force detection device 101b.

Further, when the angles θ1, θ2, θ3, and θ4 satisfy the relations of θ1=θ3 and θ2=θ4, the above calculation expressions are simplified as follows.

$$Fx = \{V\beta t3\cos(\theta 3) - V\beta t1\cos(\theta 1)\} + \{V\beta t2\cos(\theta 2) - V\beta t4\cos(\theta 4)\} +$$
$$\{V\alpha t1\cos(\pi/2 - \theta 1) - V\alpha t3\cos(\pi/2 - \theta 3)\} +$$
$$\{V\alpha t4\cos(\pi/2 - \theta 4) - V\alpha t2\cos(\pi/2 - \theta 2)\}$$
$$Fy = \{V\beta t1\sin(\theta 1) - V\beta t3\sin(\theta 3)\} + \{V\beta t2\sin(\theta 2) - V\beta t4\sin(\theta 4)\} +$$
$$\{V\alpha t1\sin(\pi/2 - \theta 1) - V\alpha t3\sin(\pi/2 - \theta 3)\} +$$
$$\{V\alpha t2\sin(\pi/2 - \theta 2) - V\alpha t4\sin(\pi/2 - \theta 4)\}$$
$$Fz = V\gamma t1 - V\gamma t2 + V\gamma t3 - V\gamma t4$$
$$Mx = L \times \{-V\gamma t1\cos(\theta 1 + 3\pi/2) + V\gamma t2\cos(\theta 2 + \pi/2) +$$
$$V\gamma t3\cos(\theta 3 + 3\pi/2) - V\gamma t4\cos(\theta 4 + \pi/2)\}$$
$$My = L \times \{V\gamma t1\sin(\theta 1 + \pi/2) + V\gamma t2\sin(\theta 2 + \pi/2) -$$
$$V\gamma t3\sin(\theta 3 + \pi/2) - V\gamma t4\sin(\theta 4 + \pi/2)\}$$
$$Mz = L \times \{V\alpha t1 - V\alpha t2 + V\alpha t3 - V\alpha t4\}$$

In this case, it is possible to remove the output drift D. As a result, it is possible to further improve the detection accuracy and detection resolution of the force detection device 101b. In addition, it is possible to further lengthen the measurement time of the force detection device 101b.

Further, when the angles θ1, θ2, θ3, and θ4 satisfy the relations of θ1=θ3=π/2 and θ2=θ4=0, the above calculation expressions are further simplified as follows.

$$Fx = V\beta t2 - V\beta t4 + V\alpha t1 - V\alpha t3$$
$$Fy = V\beta t1 - V\beta t3 + V\alpha t2 - V\alpha t4$$
$$Fz = V\gamma t1 - V\gamma t2 + V\gamma t3 - V\gamma t4$$
$$Mx = L \times (-V\gamma t1 + V\gamma t3)$$
$$My = L \times (V\gamma t2 - V\gamma t4)$$
$$Mz = L \times (V\alpha t1 - V\alpha t2 + V\alpha t3 - V\alpha t4)$$

In this manner, the external force detection circuit 150 takes the differences between the voltages Vα, Vβ, and Vγ which are output from the force detection elements 30a, 30b, 30c, and 30d, and thus can detect six-axis forces while reducing the output drift D caused by the leakage current of the switching element 135 of each of the conversion and output circuits 132a, 32b, and 32c. As a result, a detection error caused by the leakage current (output drift D) becomes relatively small, and thus it is possible to improve the detection accuracy and detection resolution of the force detection device 101b. In addition, the method of reducing the above-mentioned output drift D is effective even when the measurement time gets longer, and thus it is possible to lengthen the measurement time of the force detection device 101b. Further, in the force detection device 101b of the embodiment, since a circuit, such as a reverse bias circuit, for reducing the output drift is not required, it is possible to reduce the size of the force detection device 101b.

Meanwhile, the force detection device 101b of the embodiment includes two element pairs of the force detection elements 30a and 30c constituting the first element pair and the force detection elements 30c and 30d constituting the second element pair, but the invention is not limited thereto. When the force detection device 101b includes two element pairs of the first element pair and the second element pair as shown in FIG. 10B, six-axis forces can be obtained by a very simple arithmetic operation as described above, and thus it is possible to simplify the external force detection circuit 50. In addition, when the force detection device 101b includes three or more element pairs, it is possible to detect the six-axis forces with a higher degree of accuracy.

Sixth Embodiment

Next, a single-arm robot which is a sixth embodiment of the invention will be described with reference to FIG. 13. Hereinafter, the sixth embodiment will be described with an emphasis on the difference with the above-mentioned embodiment, and the description of the same particulars will be omitted.

FIG. 13 is a diagram illustrating an example of the single-arm robot using a force detection device 1 (1a, 1b, 101a or 101b) according to the invention. A single-arm robot 500 of FIG. 13 includes a base 510, an arm connecting body 520, an end effector 530 provided at the tip side of the arm connecting body 520, and the force detection device 1 (1a, 1b, 101a or 101b) provided between the arm connecting body 520 and the end effector 530.

The base 510 has a function of receiving an actuator (not shown) that generates power for rotating the arm connecting body 520, a control portion (not shown) that controls the actuator, and the like. In addition, the base 510 is fixed onto, for example, a floor, a wall, a ceiling, a movable carriage, and the like.

The arm connecting body 520 includes a first arm 521, a second arm 522, a third arm 523, a fourth arm 524 and a fifth arm 525, and is configured by rotatably connecting the adjacent arms. The arm connecting body 520 is driven through complex rotation or flexion about the connection portion of each arm by the control of the control portion.

The end effector 530 has a function of grasping an object. The end effector 530 includes a first finger 531 and a second finger 532. The end effector 530 reaches a predetermined operation position through the driving of the arm connecting body 520, and then the separation distance between the first finger 531 and the second finger 532 is adjusted, thereby allowing an object to be grasped.

The force detection device 1 uses any of the force detection devices 1a, 1b, 101a, and 101b of the above-mentioned embodiment, and has a function of detecting an external force applied to the end effector 530. The external force detected by the force detection device 1 is fed back to the control portion of the base 510, and thus the single-arm robot 500 can execute more precise work. In addition, the single-arm robot 500 can detect the contact of the end effector 530 to an obstacle, and the like, through six-axis forces detected by the force detection device 1. Therefore, it is possible to easily perform an obstacle avoidance operation, an object damage avoidance operation, and the like which are difficult to perform in the position control of the related art, and the single-arm robot 500 can execute work more safely. Further, in the force detection device 1 of the embodiment, since a circuit, such as a reverse bias circuit, for reducing the output drift is not required, it is possible to reduce the size of the force detection device 1. Therefore, it is possible to reduce the size of the single-arm robot 500.

Meanwhile, in the shown configuration, the arm connecting body 520 is constituted by a total of five arms, but the invention is not limited thereto. Cases where the arm connecting body 520 is constituted by one arm, is constituted by two to four arms, and is constituted by six or more arms are also within the scope of the invention.

Seventh Embodiment

Next, a moving object which is a seventh embodiment of the invention will be described with reference to FIG. 14. Hereinafter, the seventh embodiment will be described with an emphasis on the difference with the above-mentioned embodiment, and the description of the same particulars will be omitted.

FIG. 14 is a diagram illustrating an example of the moving object using the aforementioned force detection device 1 (1a, 1b, 101a or 101b). A moving object 900 of FIG. 14 can move through given power. The moving object 900, though not particularly limited, includes, for example, vehicles such as an automobile, a motorcycle, an airplane, a ship, and a train, robots such as a bipedal walking robot and a wheel moving robot, and the like.

The moving object 900 includes a main body 910 (such as, for example, a housing of a vehicle and a main body of a robot), a power output portion 920 that supplies power for moving the main body 910, the force detection device 1 (1a, 1b, 101a or 101b) that detects an external force which is generated by the movement of the main body 910, and a control portion 930.

When the main body 910 moves through the power which is supplied from the power output portion 920, vibration, acceleration and the like are generated with the movement. The force detection device 1 detects an external force caused by vibration, acceleration and the like which are generated with the movement. The external force detected by the force detection device 1 is transmitted to the control portion 930. The control portion 930 controls the power output portion 920 and the like in accordance with the external force transmitted from the force detection device 1, and thus can execute control such as posture control, vibration control and acceleration control. Further, in the force detection device 1, since a circuit, such as a reverse bias circuit, for reducing the output drift is not required, it is possible to reduce the size of the force detection device 1. Therefore, it is possible to reduce the size of the moving object 900.

In addition, the force detection device 1 (1a, 1b, 101a, and 101b) can also be applied to various types of measurement instruments such as a vibrometer, an accelerometer, a gravimeter, a dynamometer, a seismometer or a clinometer, and various types of measurement instruments using the force detection device 1 are also within the scope of the invention.

As stated above, the force detection device of the invention, and the robot and the moving object using the force detection device have been described on the basis of the shown embodiments, but the invention is not limited thereto, and the configuration of each portion can be replaced by any configuration having the same function. In addition, any other configurations may be added to the invention. In addition, the invention may be configured such that any two or more configurations (features) in the above embodiments are combined.

The entire disclosure of Japanese Patent Application No. 2013-029728 filed Feb. 19, 2013 and No. 2013-036773 Feb. 27, 2013 are expressly incorporated by reference herein.

What is claimed is:
1. A force detection device comprising:
a first element and a second element that output voltages in accordance with an external force; and an external force detection circuit that detects the external force on the basis of the voltages that are output from the first element and the second element, wherein the first element and the second element include
a piezoelectric substance having an electric axis and that outputs charge in accordance with the external force along the electric axis, and
a conversion and output circuit that converts the charge that is output from the piezoelectric substance into the voltage, wherein:

the first element and the second element are disposed so that a direction of the electric axis included in the piezoelectric substance of the first element and a direction of the electric axis included in the piezoelectric substance of the second element are opposite to each other, and the external force detection circuit detects the external force applied to the force detection device by taking a difference between the voltages that are output from the first element and the second element.

2. The force detection device according to claim 1, wherein the first element and the second element are disposed so that the direction of the electric axis of the piezoelectric substance of the first element and the direction of the electric axis of the piezoelectric substance of the second element face each other on the same axis.

3. The force detection device according to claim 1, wherein each of the piezoelectric substances includes:
a first piezoelectric plate which has a first crystal axis;
a second piezoelectric plate, provided facing the first piezoelectric plate, which has a second crystal axis; and
an internal electrode provided between the first piezoelectric plate and the second piezoelectric plate, and
the first crystal axis of the first piezoelectric plate has a polarity different from that of the second crystal axis of the second piezoelectric plate.

4. The force detection device according to claim 1, wherein when a lamination direction of the piezoelectric substance is set to a γ-axis direction, and directions which are orthogonal to the γ-axis direction and are orthogonal to each other are set to an α-axis direction and a β-axis direction, respectively,
one of the piezoelectric substances is an α-axis piezoelectric substance that outputs the charge in accordance with the external force along the α-axis direction,
one of the piezoelectric substances is a β-axis piezoelectric substance that outputs the charge in accordance with the external force along the β-axis direction, and
one of the piezoelectric substances is a γ-axis piezoelectric substance that outputs the charge in accordance with the external force along the γ-axis direction.

5. The force detection device according to claim 4, wherein the force detection device includes two first elements and two second elements,
the direction of the electric axis of the α-axis piezoelectric substance of one of the first elements and one of the second elements is opposite to the direction of the electric axis of the α-axis piezoelectric substance of the other of the first elements and the other of the second elements, and
the direction of the electric axis of the γ-axis piezoelectric substance of the one of the first elements and the one of the second elements is opposite to the direction of the electric axis of the γ-axis piezoelectric substance of the other of the first elements and the other of the second elements.

6. The force detection device according to claim 5, wherein each of the elements is disposed at equal angular intervals along a circumferential direction of the base plate or the cover plate.

7. The force detection device according to claim 1, wherein the force detection device includes a base plate and a cover plate provided separately from the base plate, to which the external force is given, and
each of the elements is provided between the base plate and the cover plate.

8. A robot comprising:
at least one arm connecting body having a plurality of arms and configured to rotatable connect adjacent arms of the plurality of arms;
an end effector that is provided at a tip side of the arm connecting body; and
a force detection device provided between the arm connecting body and the end effector, and detects an external force applied to the end effector, wherein:
the force detection device includes:
a first element and a second element that output voltages in accordance with the external force, and
an external force detection circuit that detects the external force based on the voltages that are output from the first element and the second element,
the first element and the second element include:
a piezoelectric substance that has an electric axis and that outputs charge in accordance with the external force along the electric axis, and
a conversion and output circuit that converts the charge that is output from the piezoelectric substance into the voltage,
the first element and the second element are disposed so that a direction of the electric axis included in the piezoelectric substance of the first element and a direction of the electric axis included in the piezoelectric substance of the second element are opposite to each other, and
the external force detection circuit detects the external force applied to the end effector by taking a difference between the voltages that are output from the first element and the second element.

9. A robot comprising:
at least one arm connecting body having a plurality of arms and configured to rotatable connect adjacent arms of the plurality of arms;
an end effector that is provided at a tip side of the arm connecting body; and
a force detection device provided between the arm connecting body and the end effector, and detects an external force applied to the end effector, wherein:
the force detection device includes:
a first element and a second element that output voltages in accordance with the external force, and
an external force detection circuit that detects the external force based on the voltages that are output from the first element and the second element,
the first element and the second element include:
a piezoelectric substance that has an electric axis and that outputs charge in accordance with the external force along the electric axis, and
a conversion and output circuit that converts the charge that is output from the piezoelectric substance into the voltage,
the first element and the second element are disposed so that a direction of the electric axis included in the piezoelectric substance of the first element and a direction of the electric axis included in the piezoelectric substance of the second element are opposite to each other, wherein the first element and the second element are disposed so that the direction of the electric axis of the piezoelectric substance of the first element and the direction of the electric axis of the piezoelectric substance of the second element face each other on the same axis, and the external force detection circuit detects the external force applied to the end effector by taking a difference between the voltages that are output from the first element and the second element.

* * * * *